(12) United States Patent
Wang et al.

(10) Patent No.: US 12,172,725 B2
(45) Date of Patent: Dec. 24, 2024

(54) SYSTEMS AND METHODS FOR LOCK CONTROL

(71) Applicant: BEIJING QISHENG SCIENCE AND TECHNOLOGY CO., LTD., Beijing (CN)

(72) Inventors: Fengbang Wang, Beijing (CN); Weidong Zhang, Beijing (CN); Zhen Sun, Beijing (CN)

(73) Assignee: BEIJING QISHENG SCIENCE AND TECHNOLOGY CO., LTD., Beijing (CN)

(*) Notice: Subject to any disclaimer, the term of this patent is extended or adjusted under 35 U.S.C. 154(b) by 618 days.

(21) Appl. No.: 17/347,580

(22) Filed: Jun. 14, 2021

(65) Prior Publication Data

US 2021/0309312 A1 Oct. 7, 2021

Related U.S. Application Data

(63) Continuation of application No. PCT/CN2019/125190, filed on Dec. 13, 2019.

(30) Foreign Application Priority Data

Dec. 14, 2018 (CN) .......................... 201811536658.9

(51) Int. Cl.
*B62H 5/18* (2006.01)
*B62H 5/20* (2006.01)
(Continued)

(52) U.S. Cl.
CPC ................ *B62H 5/18* (2013.01); *B62H 5/20* (2013.01); *B62L 3/06* (2013.01); *E05B 45/06* (2013.01); *E05B 71/00* (2013.01)

(58) Field of Classification Search
None
See application file for complete search history.

(56) References Cited

U.S. PATENT DOCUMENTS

| 6,097,306 A * | 8/2000 | Leon ........................ G07C 1/32 340/5.1 |
| 2008/0252434 A1 | 10/2008 | Leatherman |

(Continued)

FOREIGN PATENT DOCUMENTS

| CN | 101607578 A | 12/2009 |
| CN | 201508581 U | 6/2010 |

(Continued)

OTHER PUBLICATIONS

International Search Report in PCT/CN2019/125190 mailed on Mar. 13, 2020, 5 pages.

(Continued)

*Primary Examiner* — Thomas S McCormack
(74) *Attorney, Agent, or Firm* — METIS IP LLC

(57) ABSTRACT

The present disclosure provides a system and method for controlling a lock of a subject. The system may obtain an instruction for locking the subject. The system may obtain a status of the subject. The system may control the lock of the subject based on the instruction and the status of the subject. In response to a determination that the subject is in a motion status, the system may repeatedly update the status of the subject until an updated status of the subject is a static status. The system may lock the subject by controlling the lock of the subject based on the instruction and the static status of the subject.

20 Claims, 10 Drawing Sheets

(51) Int. Cl.
*B62L 3/06* (2006.01)
*E05B 45/06* (2006.01)
*E05B 71/00* (2006.01)

(56) References Cited

U.S. PATENT DOCUMENTS

| | | | |
|---|---|---|---|
| 2013/0116892 | A1 | 5/2013 | Wu et al. |
| 2013/0261845 | A1 | 10/2013 | Ho et al. |
| 2018/0118294 | A1* | 5/2018 | Anuth .................... B62H 5/147 |
| 2019/0054896 | A1 | 2/2019 | Watanabe et al. |
| 2020/0087951 | A1* | 3/2020 | Lee ....................... E05B 43/005 |

FOREIGN PATENT DOCUMENTS

| | | |
|---|---|---|
| CN | 105905070 A | 8/2016 |
| CN | 106600781 A | 4/2017 |
| CN | 106926815 A | 7/2017 |
| CN | 106926918 A | 7/2017 |
| CN | 107705400 A | 2/2018 |
| CN | 207212011 U | 4/2018 |
| CN | 207466836 U | 6/2018 |
| CN | 108407754 A | 8/2018 |
| CN | 108528574 A | 9/2018 |
| JP | 2000008676 A | 1/2000 |
| JP | 2008143490 A | 6/2008 |

OTHER PUBLICATIONS

Written Opinion in PCT/CN2019/125190 mailed on Mar. 13, 2020, 4 pages.
First Office Action in Chinese Application No. 201811536658.9 mailed on Jul. 22, 2020, 12 pages.
The Second Office Action in Chinese Application No. 201811536658.9 mailed on Oct. 20, 2020, 17 pages.

* cited by examiner

1200

1206

SYSTEMS AND METHODS FOR LOCK CONTROL

CROSS-REFERENCE TO RELATED APPLICATION

This application is a continuation of International Application NO. PCT/CN2019/125190, filed on Dec. 13, 2019, which claims priority of Chinese Patent Application No. 201811536658.9, filed on Dec. 14, 2018, the contents of each of which are hereby incorporated by reference.

TECHNICAL FIELD

The present disclosure generally relates to security systems, and more particularly relates to systems and methods for lock control.

BACKGROUND

With the development of Internet technology and the sharing economy, shared vehicles, due to their great advantages, are becoming more and more popular. Through a vehicle sharing service platform, a user may borrow (or rent) and return a vehicle (e.g., a bicycle) through an application installed in a user equipment, such as a smartphone terminal. In some scenarios, the user may leave the vehicle (e.g., the bicycle) without locking the vehicle. In this case, the user has to go back to lock the vehicle or remotely control a lock of the vehicle via the application installed in the user equipment. The unlocked vehicle may be moved or used by other users. However, in the vehicle moving process, such locking by remote control may cause the vehicle to suddenly stop, which may result in a traffic accident. Therefore, it is desirable to develop systems and methods for providing convenient and safe vehicle locking service to users.

SUMMARY

According to a first aspect of the present disclosure, a system for lock control is provided. The system may include a control device, and a wheel status detection unit. The control device may be configured to control a status of a lock. The wheel status detection unit may be configured to determine a status of a wheel. Upon receiving a locking instruction, the control device may obtain the status of the wheel from the wheel status detection unit. The control device may determine, based on the status of the wheel, whether to execute the locking instruction.

In some embodiments, the wheel status detection unit may acquire, when the wheel status detection unit detects that the wheel is in a motion status, speed information of the wheel repeatedly until the wheel is in a static status. The wheel status detection unit may transmit the speed information of the wheel acquired repeatedly to the control device.

In some embodiments, upon the wheel being in the static status, the control device may execute the locking instruction.

In some embodiments, the wheel status detection unit may include or be operably coupled to a speed sensor.

In some embodiments, the speed sensor may be operably coupled to a timer.

The timer may be configured to set a frequency for detecting speed information of the wheel.

In some embodiments, the system may further include a speed comparison unit operably coupled to the control device and configured to adjust, based on a speed change trend of the wheel, the frequency for detecting speed information of the wheel.

In some embodiments, the system may further include a central controller configured to send the locking instruction to the control device.

In some embodiments, the central controller may be further configured to send an unlocking instruction to the lock to cause the lock to directly execute the unlocking instruction without using the control device.

In some embodiments, the wheel status detection unit may be further configured to detect the status of the wheel and transmit the status of the wheel to the control device after the central controller sends out the locking instruction and the control device receives the locking instruction.

In some embodiments, the system may further include an alarm device and a battery monitoring unit operably coupled to the central controller. The alarm device may be configured to generate a first alarm when the battery monitoring unit detects that a battery power of the lock is less than a threshold.

In some embodiments, the system may further include a circuit monitoring unit operably coupled to the central controller and configured to detect a condition of a circuit of the system or the lock.

In some embodiments, the alarm device may be further configured to generate a second alarm when the circuit monitoring unit detects an abnormal condition of the circuit of the system or the lock.

According to a second aspect of the present disclosure, a vehicle is provided. The vehicle may include a frame, a wheel, a lock, and a system for lock control. The system may include a control device configured to control a status of the lock, and a wheel status detection unit configured to determine a status of the wheel. Upon receiving a locking instruction, the control device may obtain the status of the wheel from the wheel status detection unit. The control device may determine, based on the status of the wheel, whether to execute the locking instruction.

In some embodiments, the lock may be a horseshoe lock. The horseshoe lock may include a first lock shell, a first lock pin, and a first latching portion. The first lock shell may be disposed on the frame. The first lock pin may be disposed on the first lock shell. The first latching portion may be a part of the first lock shell or may be located on the first lock shell. The first lock pin and the first latching portion may be disposed on opposite sides of the wheel, respectively. The first lock pin may be configured to insert into the first latching portion to lock the vehicle.

In some embodiments, the lock may be a ring pin lock. The ring pin lock may include a second lock shell, a second lock pin, and a second latching portion. The second lock shell may be disposed on the frame. The second lock pin may be disposed in the second lock shell. The second lock pin may be capable of protruding from the second lock shell. The second latching portion may be annular and may be disposed on the wheel. The second latching portion may be equipped with a lock hole corresponding to the second lock pin.

In some embodiments, the vehicle may further include a drum brake coaxially disposed on the wheel.

In some embodiments, the second latching portion may be disposed on an outer surface of the drum brake.

In some embodiments, the control device may be disposed on the frame.

In some embodiments, the vehicle may further include a central controller disposed on the frame and configured to transmit the locking instruction to the control device.

According to a third aspect of the present disclosure, a method for lock control is provided. The method may be implemented on at least one computing device, each of which may include at least one processor and a storage device. The method may include obtaining a locking instruction for locking a subject; obtaining a status of the subject; and determining whether to execute the locking instruction based on the status of the subject.

According to a fourth aspect of the present disclosure, a system for lock control is provided. The system may include at least one storage device storing executable instructions, and at least one processor in communication with the at least one storage device. When executing the executable instructions, the at least one processor may cause the system to perform one or more of the following operations. The system may obtain a locking instruction for locking a subject. The system may obtain a status of the subject. The system may control, based on the locking instruction and the status of the subject, a lock of the subject.

According to a fourth aspect of the present disclosure, a non-transitory computer-readable medium storing at least one set of instructions is provided. When executed by at least one processor, the at least one set of instructions may direct the at least one processor to perform a method. The method may include obtaining a locking instruction for locking a subject; obtaining a status of the subject; and controlling, based on the locking instruction and the status of the subject, a lock of the subject.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein.

DETAILED DESCRIPTION

Figure 1:
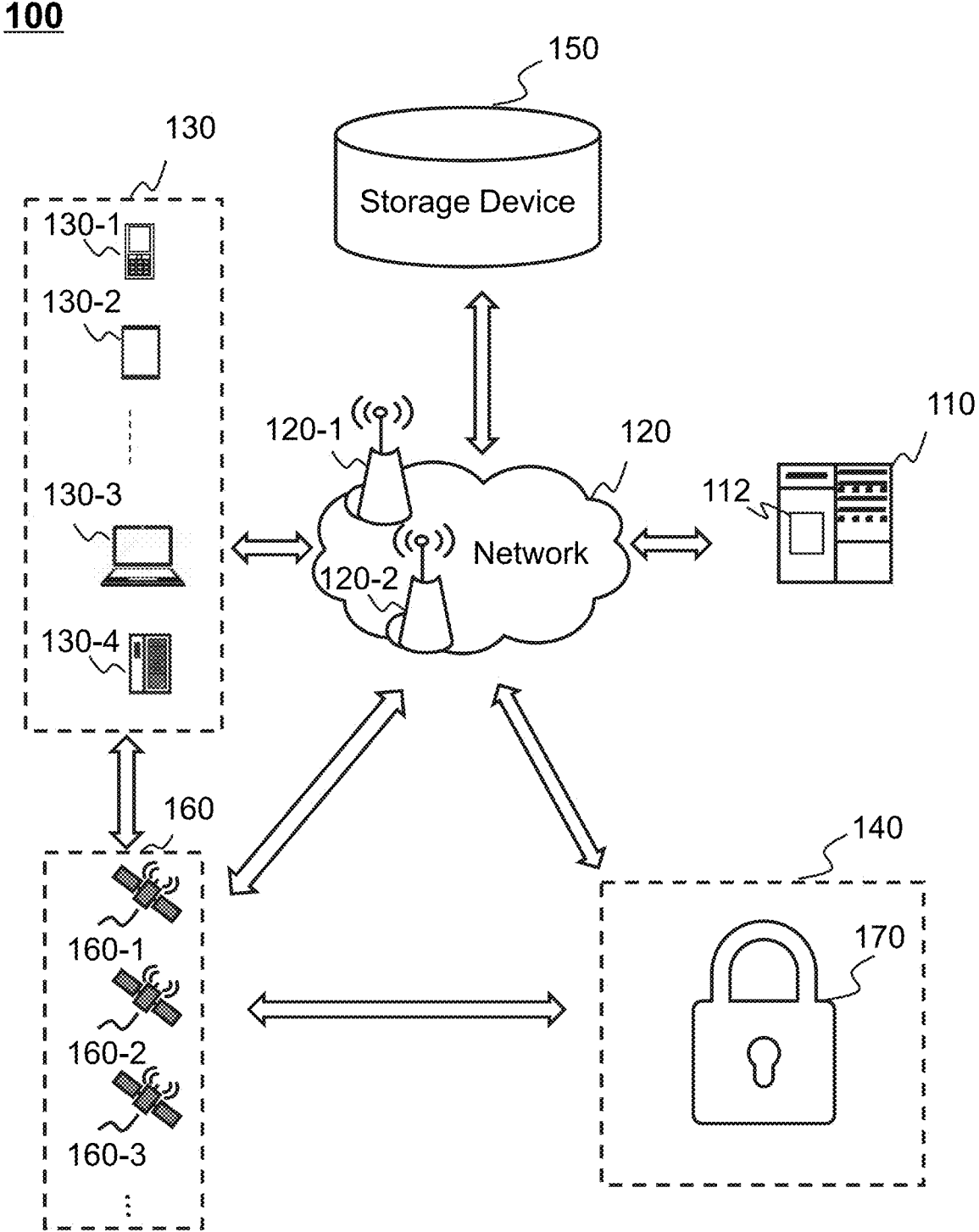
FIG. 1 is a schematic diagram illustrating an exemplary security system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It should also be understood that terms such as "top," "bottom," "upper," "lower," "vertical," "lateral," "above," "below," "upward(s)," "downward(s)," "left-hand side," "right-hand side," "horizontal," and other such spatial reference terms are used in a relative sense to describe the positions or orientations of certain surfaces/parts/components of a vehicle with respect to other such features of the vehicle when the vehicle is in a normal operating position and may change if the position or orientation of the vehicle changes.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Provided herein are systems and methods for controlling a lock. A system may include at least one storage device storing executable instructions, and at least one processor in communication with the at least one storage device. When executing the executable instructions, the at least one processor may cause the system to obtain a locking instruction for locking a subject (e.g., a vehicle). The at least one processor may further cause the system to obtain a status of the subject. The at least one processor may cause the system to control a lock of the subject based on the locking instruction and the status of the subject.

In some embodiments, when the system determines that the subject is in a motion status, the system may not immediately execute the locking instruction. The system may repeatedly update the status of the subject until an updated status of the subject is a static status. The system may lock the subject by control the lock of the subject based on the locking instruction and the static status of the subject. In some embodiments, the system may lock the subject when the subject is in the static status. Accordingly, the system may avoid traffic accidents caused by a sudden stop or lock of the subject during the subject moving process, thereby ensuring the safety of the rider/driver of the subject, and avoiding the loss of the subject.

FIG. 1 is a schematic diagram illustrating an exemplary security system according to some embodiments of the present disclosure. The security system 100 may include a server 110, a network 120, one or more terminal devices 130, a vehicle 140, a storage device 150, a positioning device 160, and a lock 170. The security system 100 may secure the vehicle 140 by the lock 170 by implementing the methods and/or processes disclosed in the present disclosure. In some embodiments, the vehicle 140 to be secured may be a bicycle. The bicycle may be used in a bicycle sharing system. The bicycle sharing system may provide a bicycle sharing service allowing a user to use a bicycle for a ride. When the user finishes the ride and wants to return the bicycle, the user may leave the bicycle in an area where the parking of the bicycle is permitted and lock the bicycle. The bicycle may then be ready for a next user.

The server 110 may communicate with the terminal device 130, the vehicle 140, and/or the lock 170 to provide various functionalities of the security system 100. In some embodiments, the server 110 may receive a request associated with the vehicle 140 from the terminal device 130 via, for example, the network 120. For example, the server 110 may receive a request to lock the vehicle 140 from the terminal device 130 via, for example, the network 120. As another example, the vehicle 140 may be a bicycle in a bicycle sharing system, and the request may be a service request to borrow (or rent) the bicycle. The service request may include order information relating to the ride and/or the bicycle, including, for example, a bicycle type, a departing place, a destination, mileage, a route, or the like, or any combination thereof. The server 110 may also transmit information to the terminal device 130, the vehicle 140, and/or the lock 170. For example, the server 110 may transmit to the vehicle 140 and/or the lock 170 an instruction to lock the vehicle 140, an instruction to unlock the vehicle 140, and/or the information related to the vehicle 140 (e.g., the information indicating whether the vehicle 140 is locked).

In some embodiments, the vehicle 140 may be a bicycle in a bicycle sharing system. The server 110 may determine one or more bicycles in response to a service order received from the terminal device 130 and transmit the information relating to the one or more bicycles to the terminal device 130, including, for example, the locations of the one or more bicycles, the fees for the ride (e.g., the total fees for the ride, the hourly rate for the ride), or the like, or a combination thereof. The server 110 may also provide a service fee management. The server 110 may determine the cost of a ride based on a monthly membership, a quarterly membership, a season (e.g., spring, summer) membership, an annual membership, or fees per ride.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the terminal device 130, and/or the storage device 150 via the network 120. As another example, the server 110 may be directly connected to the terminal device 130, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing device 112. The processing device 112 may process information and/or data related to performing one or more functions described in the present disclosure. For example, the processing device 112 may obtain a locking instruction for locking the vehicle 140. The processing device 112 may obtain a status of the vehicle 140. The processing device 112 may control the lock 170 of the vehicle 140 based on the locking instruction and/or the status of the vehicle 140. As another example, in response to a determination that the vehicle 140 is in a motion status, the processing device 112 may repeatedly update the status of the vehicle 140 until an updated status of the vehicle 140 is a static status. The processing device 112 may lock the vehicle 140 by controlling the lock 170 based on the locking instruction and/or the static status of the vehicle 140. As still an example, the processing device 112 may obtain an unlocking instruction for unlocking the vehicle 140. The processing device 112 may transmit the unlocking instruction directly to the lock 170 without using a control device as described elsewhere in the present disclosure (e.g., FIGS. 4-8 and the descriptions thereof). In some embodiments, the processing device 112 may include one or more processing units (e.g., single-core processing engine(s) or multi-core processing engine(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the security system 100 (e.g., the server 110, the terminal device 130, the vehicle 140, the storage device 150, or the lock 170) may transmit information and/or data to one or more other components in the security system 100 via the network 120. For example, the server 110 may access and/or obtain data of a plurality of vehicles 140 from the storage device 150 via the network 120. As another example, the server 110 may transmit a message indicating whether the vehicle 140 is locked to the terminal device 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the security system 100 may be connected to the network 120 to exchange data and/or information.

In some embodiments, a user may be an owner of the terminal device 130. The terminal device 130 may receive input from the user and transmit the information relating to the input to the server 110 via the network 120. The terminal device 130 may also receive information from the server 110 via the network 120. For example, the terminal device 130 may receive input from the user relating to the vehicle 140 to the server 110, and/or receive information or instructions from the server 110. Merely by way of example, a user may input a request for maintenance service when he or she fails to lock the vehicle 140. The terminal device 130 may be configured to transmit the request for maintenance service to the server 110. In some embodiments, the vehicle 140 may be a bicycle in a bicycle sharing system. The terminal device 130 may be configured to transmit a service request to the server 110 for searching for bicycles near the location of the terminal device 130. The server 110 may determine one or more bicycles (e.g., the locations of the bicycles, number of the bicycles) near the location of the terminal device 130 according to and in response to the service request. The server 110 may also transmit information relating to the determined one or more bicycles to the terminal device 130 via the network 120. The information of the determined one or more bicycles may be displayed on the terminal device 130 associated with an electronic map. The terminal device 130 may receive input from the user indicating a selected bicycle from the bicycles displayed on the terminal device 130, which may be transmitted to the server 110. The terminal device 130 may also provide a walking navigation for guiding the user to the location of the selected bicycle. As another example, the terminal device 130 may receive input from the user for reserving a bicycle and transmit the information to the server 110. As yet another example, the terminal device 130 may transmit feedback information provided by the user to the server 110. The feedback information may include the information of the bicycle (e.g., whether any part of the bicycle needs to be repaired), improvement suggestions, etc.

In some embodiments, the terminal device 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, a built-in onboard television, a built-in tablet, etc. In some embodiments, the terminal device 130 may include a signal transmitter and a signal receiver configured to communicate with the positioning device 160 for locating the position of the user and/or the terminal device 130. For example, the terminal device 130 may transmit an instruction to the positioning device 160 to locate the position of the user and/or the terminal device 130. In some embodiments, the terminal device 130 may be part of the processing device 112.

The vehicle 140 may include a bicycle, a power assisted bicycle (e.g., an electric bicycle), a tricycle, a motorcycle, a car, a motor vehicle, or the like, or any combination thereof. In the present disclosure, the vehicle 140 may be described in the form of bicycle as examples for illustration purposes, but it should not be interpreted to limit the vehicle 140 to the form of bicycle only. The lock 170 may be configured to lock the vehicle 140. The lock 170 may include any combination of mechanisms to implement the functions thereof. For example, the lock 170 may be a mechanical lock or an electronic lock. The vehicle 140 and the lock 170 may be separate parts that are mechanically connected to each other. For example, the vehicle 140 and the lock 170 may be separate parts, and the lock 170 may be mounted on the vehicle 140. Additionally or alternatively, the vehicle 140 and the lock 170 may form an integral device. More descriptions regarding the lock 170 may be found elsewhere in the present disclosure (e.g., FIGS. 11-12B and the descriptions thereof).

In some embodiments, the vehicle 140 may be a bicycle of a bicycle sharing system. The bicycle may be any type of bicycle including, for example, a unicycle, a bicycle, a tricycle, a tandem, a motor bicycle, an electric bicycle, a moped, etc. The information exchange between one or more components of the security system 100 may be initiated by way of launching the mobile application of the bicycle sharing service on a terminal device 130, requesting a bicycle service, or inputting a query via the terminal device 130 (e.g., locking the bicycle). The bicycle and/or the lock 170 may be identified with a unique symbol. The unique symbol may include a barcode, a quick response (QR) code, a serial number including letters and/or digits, or the like, or any combination thereof. For example, the identification (ID) of the lock 170 may be obtained by scanning the QR code of the lock 170 and/or the QR code of the bicycle through a mobile application of the terminal device 130 or a camera of the terminal device 130 (if any). Merely by way of example, the ID of the lock 170 may be obtained by scanning the QR code of the bicycle through a camera of a mobile phone.

The vehicle 140 and/or the lock 170 may communicate with the server 110, the network 120, the terminal device 130, the storage device 150, and/or the positioning device 160. For example, the vehicle 140 and/or the lock 170 may transmit information associated with the vehicle 140 and/or the lock 170 to the server 110 via the network 120. The information associated with the vehicle 140 and/or the lock 170 may include a location of the vehicle 140 and/or the lock 170, a status of the vehicle 140 (e.g., a motion status or a static status), a locked/unlocked status of the vehicle 140 and/or the lock 170, a battery power of the vehicle 140 and/or the lock 170, a condition of a circuit of the lock 170, operation information of the lock 170, or the like, or a combination thereof. The server 110 may monitor the vehicle 140 based on the information associated with the vehicle 140 and/or the lock 170. As another example, the vehicle 140 and/or the lock 170 may receive an instruction (e.g., an instruction to lock/unlock the vehicle 140) from the terminal device 130 and/or the server 110. As yet another example, the vehicle 140 may include a signal transmitter and a signal receiver (e.g., a GPS component of the vehicle 140) configured to communicate with the positioning device 160 for locating a position of the vehicle 140.

The storage device 150 may store data, instructions, and/or any other information. In some embodiments, the storage device 150 may store data obtained from the terminal device 130 and/or the processing device 112. The data may include data related to users, terminal devices 130, vehicle 140, etc. Merely by way of example, the vehicle 140 may be a bicycle of a bicycle sharing system. The data related to the users may include user profiles including for example, names of the users, mobile numbers of the users, ID numbers of the users, types of the users (e.g., annual card users, quarterly card users, or monthly card users), usage records of the users (e.g., riding time, cost), credit rating of the users, historical routes, account balance, etc. The data related to the bicycles may include service conditions of the bicycles (an inactive state, a booking state, on a ride, in a maintenance state, in a loss state), positions of the bicycles, types of the bicycles (e.g., a unicycle, a bicycle, a tricycle, a tandem, a motor bicycle, and an electric bicycle), etc. In some embodiments, the storage device 150 may store data obtained from the terminal device 130 and/or the vehicle 140. For example, the storage device 150 may store log information associated with the terminal device 130. In some embodiments, the storage device 150 may store data and/or instructions that the server 110 may execute or use to perform exemplary methods described in the present disclosure.

In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the security system 100 (e.g., the processing device 112, the terminal device 130, etc.). One or more components in the security system 100 may access the data or instructions stored in the storage device 150 via the network 120. In some embodiments, the storage device 150 may be directly connected to or communicate with one or more other components in the security system 100 (e.g., the processing device 112, the terminal device 130, etc.). In some embodiments, the storage device 150 may be part of the processing device 112.

The positioning device 160 may determine information associated with an object, for example, one or more of the terminal device 130, or the vehicle 140 (e.g., a bicycle). For example, the positioning device 160 may determine a current time and/or a current location of the terminal device 130 and/or the vehicle 140. In some embodiments, the positioning device 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a speed, or an acceleration of the object, and/or a current time. The positioning device 160 may include one or more satellites, for example, a satellite 160-1, a satellite 160-2, and a satellite 160-3. The satellite 160-1 through 160-3 may determine the information mentioned above independently or jointly. The positioning device 160 may transmit the information mentioned above to the terminal device 130, or the vehicle 140 via wireless connections.

In some embodiments, one or more components of the security system 100 (e.g., the server 110, the terminal device 130) may have permission to access the storage device 150. In some embodiments, one or more components of the security system 100 (e.g., the server 110, the terminal device 130, or the vehicle 140) may read and/or modify information related to the user, and/or the vehicle 140 when one or more conditions are met. For example, the server 110 may read and/or modify one or more users' information after a ride of a bicycle is completed.

One of ordinary skill in the art would understand that when an element (or component) of the security system 100 performs, the element may perform through electrical signals and/or electromagnetic signals. For example, when the terminal device 130 processes a task, such as making a determination, unlocking a vehicle 140, the terminal device 130 may operate logic circuits in its processor to process such task. When the terminal device 130 transmits out a query (e.g., information relating to a location of a vehicle 140) to the server 110, a processor of the terminal device 130 may generate electrical signals encoding the query. The processor of the terminal device 130 may then transmit the electrical signals to an output port. If the terminal device 130 communicates with the server 110 via a wired network, the output port may be physically connected to a cable, which further transmits the electrical signal to an input port of the server 110. If the terminal device 130 communicates with the server 110 via a wireless network, the output port of the terminal device 130 may be one or more antennas, which convert the electrical signals to electromagnetic signals. Similarly, a vehicle 140 and/or a lock 170 may process a task through operation of logic circuits in its processor, and receive an instruction and/or service order from the server 110 via electrical signals or electromagnet signals. Within an electronic device, such as the terminal device 130, the vehicle 140, the lock 170, and/or the server 110, when a processor thereof processes an instruction, transmits out an instruction, and/or performs an action, the instruction and/or action is conducted via electrical signals. For example, when the processor retrieves data (e.g., a plurality of user profiles) from a storage medium (e.g., the storage device 150), it may transmit out electrical signals to a reading device of the storage medium, which may read structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
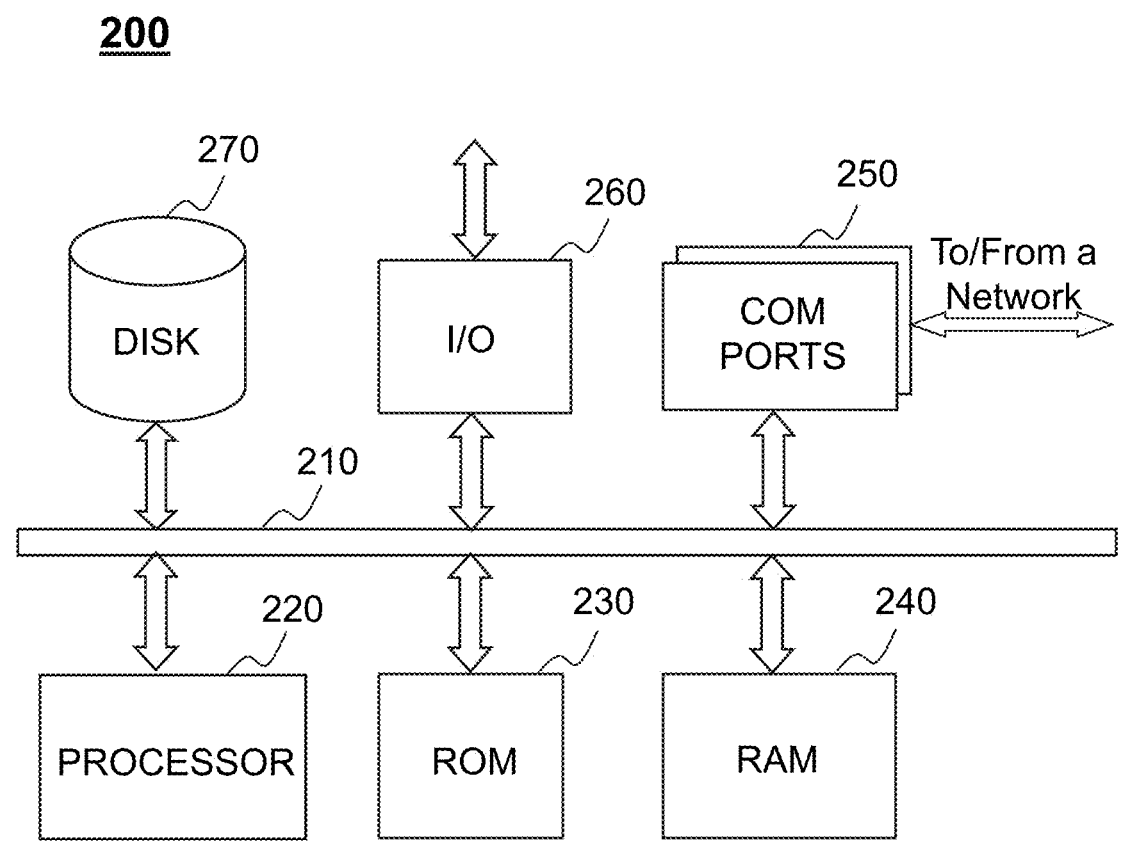
FIG. 2 is a schematic diagram illustrating exemplary hardware and/or software components of an exemplary computing device according to some embodiments of the present disclosure.

FIG. 2 is a schematic diagram illustrating hardware and/or software components of an exemplary computing device 200 on which the processing device 112 and/or terminal device 130 may be implemented according to some embodiments of the present disclosure. For example, the processing device 112 may be implemented on the computing device 200 and configured to perform functions of the processing device 112 disclosed in this disclosure.

The computing device 200 may be a general purpose computer or a special purpose computer. The computing device 200 may be used to implement any component of the security system 100 as described herein. The computing device 200 may implement any component that performs one or more functions disclosed in the present disclosure. In FIGS. 1-2, only one such computing device is shown purely for convenience purposes. One of ordinary skill in the art would understand that the computer functions relating to the security system 100 as described herein may be implemented in a distributed fashion on a number of similar platforms, to distribute the processing load.

The computing device 200, for example, may include communication ports (COM PORTS) 250 connected to and from a network (e.g., the network 120) connected thereto to facilitate data communications. The computing device 200 may also include a processor 220, in the form of one or more processors, for executing program instructions. The exemplary computer platform may include an internal communication bus 210, a program storage and a data storage of different forms, for example, a disk 270, and a read-only memory (ROM) 230, or a random access memory (RAM) 240, for various data files to be processed and/or transmitted by the computer. The exemplary computer platform may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O 260, supporting input/output between the computing device 200 and other components.

The computing device 200 may also receive programs and data via the communication network.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

Figure 3:
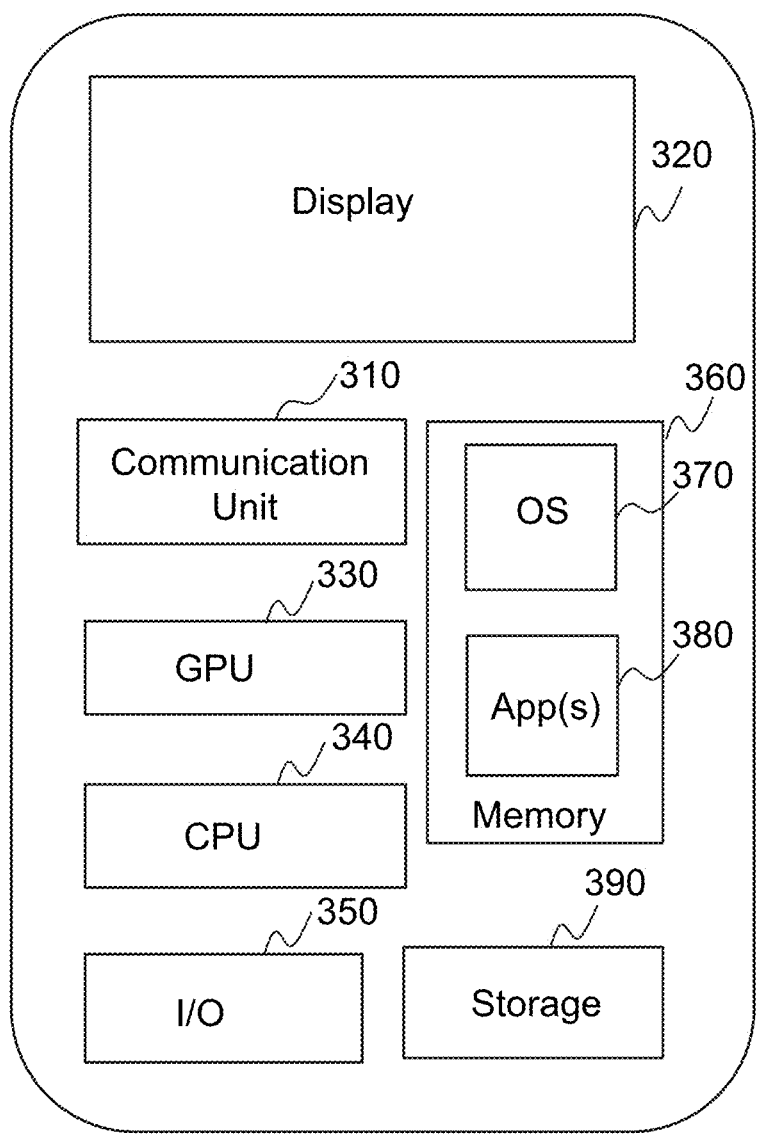
FIG. 3 is a schematic diagram illustrating exemplary hardware and/or software components of an exemplary mobile device according to some embodiments of the present disclosure.

FIG. 3 is a schematic diagram illustrating hardware and/or software components of an exemplary mobile device 300 on which a terminal device may be implemented according to some embodiments of the present disclosure. As illustrated in FIG. 3, the mobile device 300 may include a communication unit 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to lock controlling or other information from the processing device 112. User interactions with the information stream may be achieved via the I/O 350 and provided to the processing device 112 and/or other components of the imaging system 100 via the network 120. In some embodiments, a user may borrow (or rent) a vehicle 140 (e.g., a bicycle) via the mobile device 300. The user may also control the lock 170 of the vehicle 140 via the mobile device 300. For example, the user may input an instruction to close the lock 170 via the mobile device 300.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to control the lock 170 as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
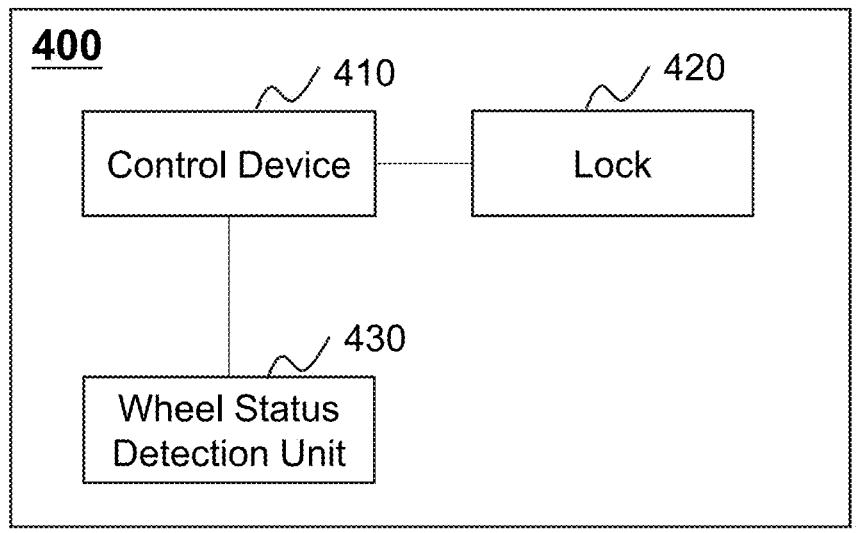
FIG. 4 is a block diagram illustrating an exemplary lock control system for a vehicle according to some embodiments of the present disclosure.

FIG. 4 is a block diagram illustrating an exemplary lock control system for a vehicle according to some embodiments of the present disclosure. As illustrated in FIG. 4, the lock control system 400 may include a control device 410, a lock 420, and a wheel status detection unit 430. The control device 410 may be configured to control a status (e.g., locking or unlocking status) of the lock 420 of a vehicle (e.g., the vehicle 140). The wheel status detection unit 430 may be configured to detect a status of the vehicle (e.g., a status of a wheel of the vehicle). Upon receiving a locking instruction, the control device 410 may control the wheel status detection unit 430 to detect a status of the wheel, or receive the status of the wheel from the wheel status detection unit 430. The wheel status detection unit 430 may transmit a detection result (e.g., the status of the wheel or status information of the wheel) to the control device 410. The control device 410 may determine whether to execute the locking instruction based on the detection result (e.g., the status of the wheel or status information of the wheel).

Figure 11:
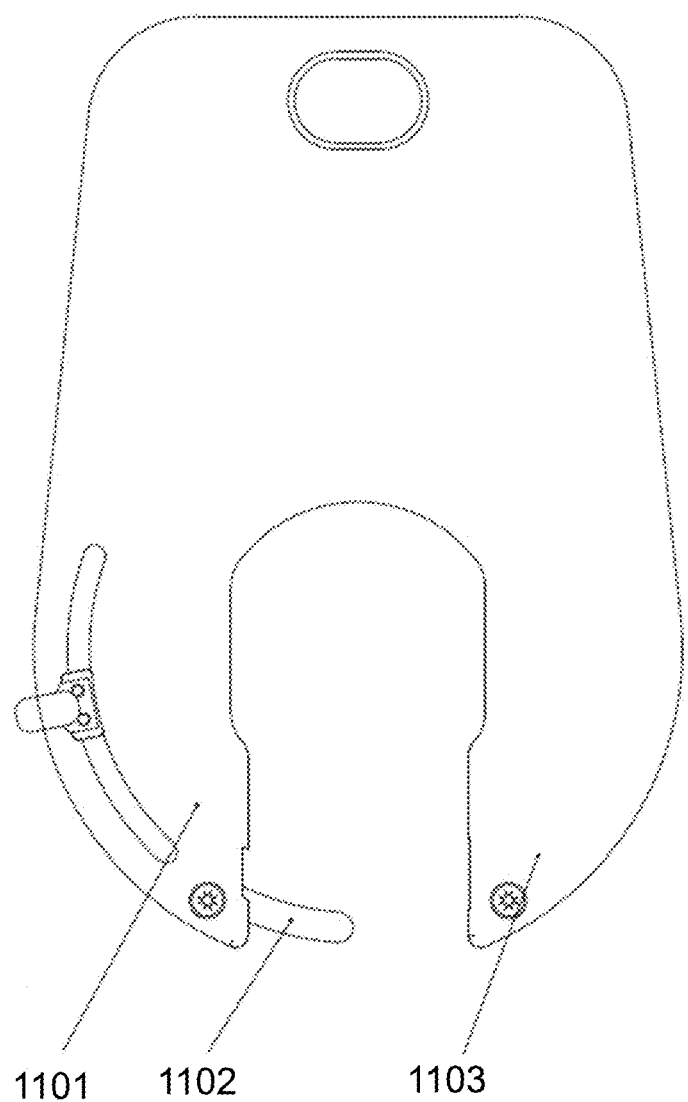
FIG. 11 is a schematic diagram illustrating an exemplary structure of a horseshoe lock according to some embodiments of the present disclosure.
Figure 12A:
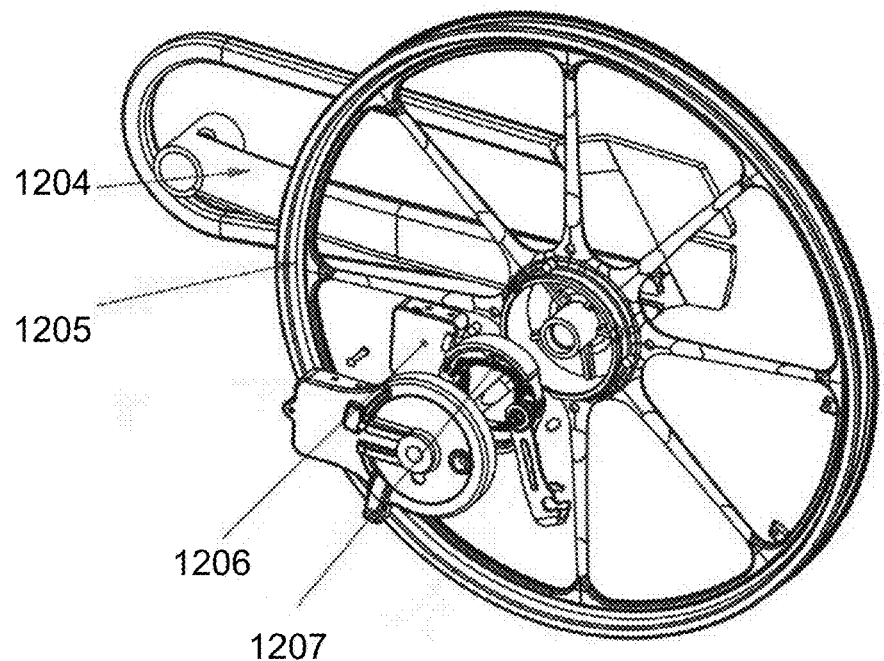
FIG. 12A is a schematic diagram illustrating an exemplary ring pin lock coupled to a vehicle according to some embodiments of the present disclosure.
Figure 12B:
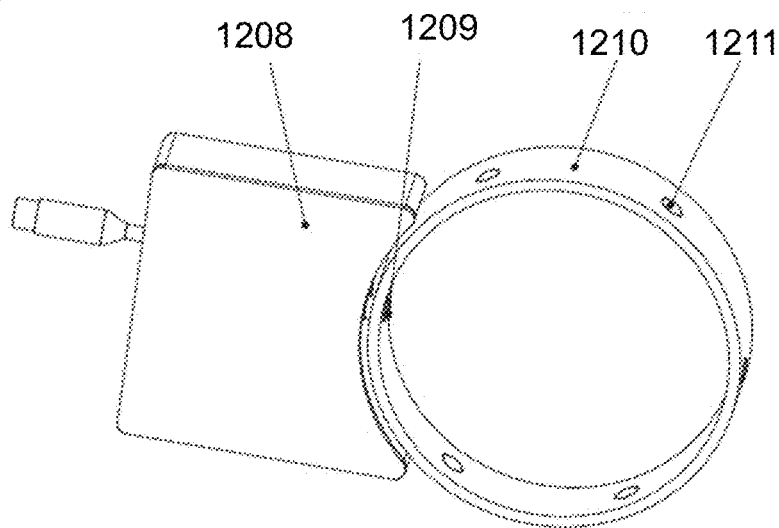
FIG. 12B is a schematic diagram illustrating an exemplary structure of a ring pin lock according to some embodiments of the present disclosure.

In some embodiments, the lock 420 may include a horseshoe lock (as shown in FIG. 11), a ring pin lock (as shown in FIGS. 12A-12B), a cam rotor lock, a slide rotor lock, a pin tumbler lock, a smart lock (e.g., a fingerprint lock, a coded lock, an induction lock, etc.), or the like. The status of the wheel may include a motion status and/or a static status. As used herein, the motion status of the wheel may refer that a motion speed of the wheel is greater than a speed threshold, such as 0 m/s, 0.05 m/s, 0.1 m/s, 0.15 m/s, 0.2 m/s, etc. In some embodiments, the motion status of the wheel may be referred to as a rotation status of the wheel. The static status of a wheel may refer that a motion speed of the wheel is less than the speed threshold. It should be noted that, in response to a determination that the motion speed of the wheel is equal to the speed threshold, the lock control system 400 may determine the wheel is in either the motion status or the static status. In some embodiments, the speed threshold may be set according to a default setting of the lock control system 400 or preset by a user or operator via the terminal devices 130. In some embodiments, the wheel status detection unit 430 may detect the status of the wheel under the control of the control device 410. Alternatively or additionally, the wheel status detection unit 430 may detect the status of the wheel automatically, and transmit the status of the wheel to the control device 410 in response to a request from the control device 410. In some embodiments, the wheel status detection unit 430 may detect a speed of the wheel, and determine the status of the wheel based on the speed. For example, if the speed of the wheel is larger than the speed threshold, the wheel status detection unit 430 may determine that the wheel is in the motion status. As another example, if the speed of the wheel is less than the speed threshold, the wheel status detection unit 430 may determine that the wheel is in the static status. Alternatively or additionally, when the wheel status detection unit 430 detects that the wheel is in the motion status, the wheel status detection unit 430 may acquire speed information of the wheel repeatedly until the wheel is in the static status and transmit the speed information of the wheel to the control device 410. It should be noted that a status of the vehicle may correspond to the status of the wheel. For example, if the wheel is in the motion status, the vehicle may be in a motion status. If the wheel is in the static status, the vehicle may be in a static status. In some embodiments, a speed of the vehicle may correspond to or indicated (or denoted) by the speed of the wheel.

In some embodiments, the locking instruction may be initiated by a user via a terminal device 130. For example, the locking instruction may be generated based on the user's input operation, for example, pressing a button, pressing a digital button, inputting a password, scanning a barcode for locking the lock, etc. In some embodiments, the locking instruction may be generated (e.g., automatically) when a distance between the vehicle and the user is greater than a distance threshold. In some embodiments, the distance threshold may be set according to a default setting of the lock control system 400 or preset by a user or operator via the terminal devices 130. In some embodiments, if a location of the vehicle is out of a service area, the locking instruction may be automatically initiated. In some embodiments, if the locking instruction is not executed (e.g., within a predetermined time period), another locking instruction may be automatically generated again.

In some embodiments, the control device 410 and/or the wheel status detection unit 430 may be disposed on or integrated in the lock 420. The control device 410 may receive a locking instruction issued for the lock 420. The control device 410 may determine whether to execute the locking instruction based on the detection result (e.g., the status of the wheel) detected by the wheel status detection unit 430. Specifically, in some embodiments, after or when the control device 410 receives the locking instruction, the control device 410 may execute the locking instruction when the wheel status detection unit 430 detects that the wheel is in the static status. In some embodiments, after the control device 410 receives the locking instruction, the control device 410 may not execute the locking instruction when the wheel status detection unit 430 detects that the wheel is in the rotation status (or the motion status).

In some embodiments, the control device 410 may determine whether to execute the locking instruction based on information relating to the vehicle. Exemplary information relating to the vehicle may include status information of the vehicle (or status information of the wheel of the vehicle), a location of the vehicle (e.g., whether the vehicle is in a forbidden region), whether the vehicle is in service, whether the vehicle fails (e.g., whether a lock of the vehicle fails), or the like, or a combination thereof. For example, if the wheel of the vehicle is in the static status, and the vehicle is in a forbidden region, the control device 410 may determine not to execute the locking instruction, so that a person (e.g., a volunteer, a passerby, etc.) can drive the vehicle out of the forbidden region. In some embodiments, if the vehicle is moved out of the forbidden region, and is in the static status again, the control device 410 may determine to execute the locking instruction.

In some embodiments, the control device 410 and/or the wheel status detection unit 430 may be disposed on a frame (e.g., a front frame, a rear frame, a main frame, etc.) of the vehicle, or a handle of the vehicle, or any other component of the vehicle. In some embodiments, the control device 410 may send a control signal to a drive device (not shown) of the lock 420 based on the locking instruction. The drive device may control the movement of a locking mechanism (e.g., a lock pin) of the lock 420 to lock or unlock the vehicle. For example, if the lock is a horseshoe lock, the drive device may drive a lock pin of the horseshoe lock to insert into a latching portion of the horseshoe lock to lock the vehicle.

In some embodiments, the drive device may be an electric machinery. The control device 410 may control a working status of the electric machinery, such as a forward rotation, a reverse rotation, or a stopping of the rotation, thereby realizing the control of the status of the lock 420.

As illustrated above, by performing such a determination process (i.e., a process for detecting the status of the wheel), it can be ensured that the vehicle may not suddenly stop due to a sudden locking of the vehicle in the vehicle moving process, thereby ensuring the safety of a rider/driver of the vehicle, and reducing the probability of accidents.

In some embodiments, the wheel status detection unit 430 may detect the status of the wheel in real time or periodically. In some embodiments, the wheel status detection unit 430 may detect the status of the wheel according to a requirement of a user or the lock control system 400.

In some embodiments, after the control device 410 receives the locking instruction, the control device 410 may (e.g., immediately) obtain status information of the wheel from the wheel status detection unit 430. When the wheel is in the static status, the control device 410 may control the lock 420 to execute the locking instruction to lock the vehicle. When the wheel is in the rotation status, the control device 410 may not execute (immediately) the locking instruction. In some embodiments, the locking instruction may remain effective until the vehicle is locked or the locking instruction is cancelled. Because the lock 420 does not lock the vehicle during the vehicle moving process, a sudden stop of the vehicle during the vehicle moving process may be avoided.

In some embodiments, if the wheel is in the motion status, the wheel status detection unit 430 may repeatedly detects the status of the wheel until the wheel is in the static status, and accordingly, the control device 410 may repeatedly obtain the status of the wheel (until the wheel is in the static status).

In some embodiments, the wheel status detection unit 430 may include or may be operably coupled to a speed sensor. The speed sensor may be configured to detect a rotational speed of the wheel. In some embodiments, the status of the wheel may be determined based on the rotational speed of the wheel. For example, if the rotational speed is not equal to zero, the wheel may be determined as in the rotation status (or motion status). As another example, if the rotational speed is equal to zero, the wheel may be determined as in the static status.

Exemplary speed sensors may include a photoelectric speed sensor, a magneto-electric speed sensor, a Hall-type speed sensor, etc. In some embodiments, if the rotational speed of the wheel is greater than a rotational speed threshold (e.g., 0.1 rps, 0.15 rps, 0.2 rps, etc.), the wheel may be determined as in the rotation status. If the rotational speed of the wheel is less than the rotational speed threshold, the wheel may be determined as in the static status. It should be noted that, in response to a determination that the rotational speed of the wheel is equal to the rotational speed threshold, the lock control system 400 (e.g., the wheel status detection unit 430) may determine the wheel is in either the rotation status or the static status. In some embodiments, the rotational speed threshold may be set according to a default setting of the lock control system 400 or preset by a user or operator via the terminal devices 130.

It should be noted that, in some embodiments, the wheel status detection unit 430 may include but not limited to the speed sensor. Alternatively or additionally, the wheel status detection unit 430 may include other sensors that can detect the status of the wheel, such as a displacement sensor, a distance sensor, an acceleration sensor (or an accelerometer), a steering angle sensor, a location sensor, a yaw angle sensor, a gyroscope sensor, etc. That is, the wheel status detection unit 430 may be any device or sensor that can detect the status of the wheel, and/or obtain status information of the wheel.

In some embodiments, the wheel status detection unit 430 may detect the status of the vehicle or wheel based on information obtained from the sensor(s) directly or indirectly. For example, if the wheel status detection unit 430 includes a displacement sensor, a distance sensor, or a location sensor, the wheel status detection unit 430 may first detect a displacement or distance of the vehicle within a predetermined time period. Then the wheel status detection unit 430 may determine a speed of the vehicle based on the displacement or distance and the predetermined time period and determine the status of the vehicle based on the speed. As another example, if the wheel status detection unit 430 includes a speed sensor, an acceleration sensor, a steering angle sensor, a gyroscope sensor, or a yaw angle sensor, the wheel status detection unit 430 may obtain a motion parameter (e.g., a speed, a steering angle, etc.) associated with the vehicle or wheel within a predetermined time period. The wheel status detection unit 430 may compare the motion parameter with a predetermined motion parameter to determine the status of the vehicle.

In some embodiments, if the control device 410 does not execute the locking instruction (e.g., when the wheel is in the motion status), the wheel status detection unit 430 (e.g., the speed sensor) may transmit information relating to the (rotational) speed (or the status information) of the vehicle to the control device 410. The control device 410 may execute the locking instruction when the (rotational) speed is zero or less than the (rotational) speed threshold.

In some embodiments, the control device 410 may repeatedly obtain the rotational speed of the wheel from the wheel status detection unit 430 (e.g., the speed sensor) until the rotational speed is zero or less than the rotational speed threshold. The control device 410 may stop or terminate obtaining of the rotational speed of the wheel from the wheel status detection unit 430 (e.g., the speed sensor) when the wheel is in the static status, and execute the locking instruction.

Figure 5:
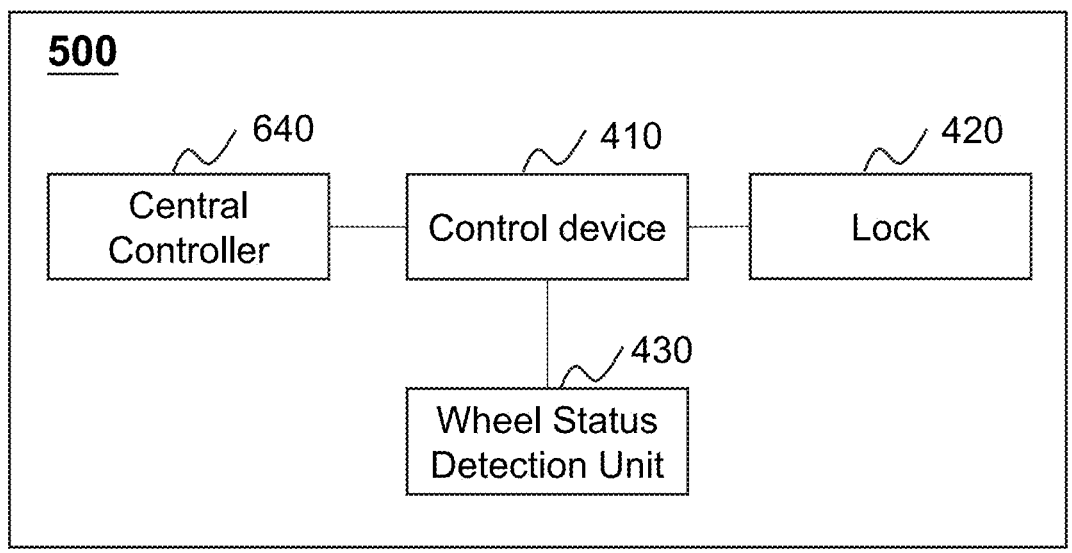
FIG. 5 is a block diagram illustrating an exemplary lock control system for a vehicle according to some embodiments of the present disclosure.
Figure 6:
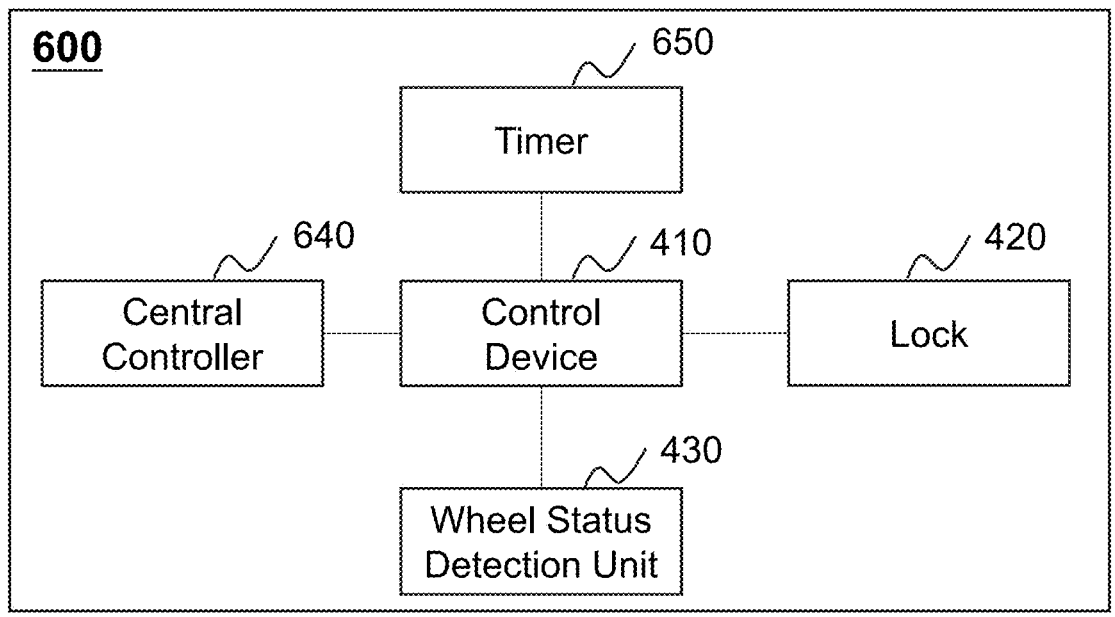
FIG. 6 is a block diagram illustrating an exemplary lock control system for a vehicle according to some embodiments of the present disclosure.

FIG. 5 is a block diagram illustrating an exemplary lock control system for a vehicle according to some embodiments of the present disclosure. FIG. 6 is a block diagram illustrating an exemplary lock control system for a vehicle according to some embodiments of the present disclosure. As shown in FIG. 5, the lock control system 500 may include the control device 410, the lock 420, the wheel status detection unit 430, and/or a central controller 640. As shown in FIG. 6, the lock control system 600 may include the control device 410, the lock 420, the wheel status detection unit 430, the central controller 640, and/or a timer 650. In some embodiments, the central controller 640 may be configured to send the locking instruction to the control device 410. More descriptions about the central controller 640 may be found elsewhere in the present disclosure (e.g., FIG. 7 and the descriptions thereof). In some embodiments, the timer 650 may be operably coupled to the control device 410.

In some embodiments, the timer 650 may be operably coupled to the wheel status detection unit 430 (e.g., the speed sensor). The timer 650 may be configured to set a timing for detecting the speed of the vehicle (also referred to as a frequency for detecting speed information (e.g., the rotational speed) of the wheel), so that the wheel status detection unit 430 may detect the speed of the wheel accordingly (e.g., at regular or irregular intervals). For example, the wheel status detection unit 430 may detect the speed of the wheel at regular intervals (e.g., each second, each 3 seconds, each 5 seconds, each 10 seconds, each 15 seconds, etc.). By controlling, using the timer 650, the frequency at which the wheel status detection unit 430 acquires the speed of the vehicle, the amount of data acquired by the control device 410 may be reduced, and inaccurate performance of the control device 410 caused by excessive data acquisition may be avoided.

As used herein, a frequency for detecting speed information of the wheel may be referred to as a frequency at which the wheel status detection unit 430 acquires the speed of the vehicle. In some embodiments, the frequency may be a default setting of the lock control system 600. In some embodiments, the frequency may be adjustable according to a speed change trend of the vehicle. More descriptions about the frequency may be found elsewhere in the present disclosure (e.g., FIG. 7 and the descriptions thereof).

It should be noted that the above descriptions of the lock control system are merely provided for the purposes of illustration, and not intended to limit the present disclosure. For persons having ordinary skills in the art, components of the lock control system may be combined in various ways or connected with other components as sub-systems under the teaching of the present disclosure and without departing from the principle of the present disclosure. For example, in some embodiments, the timer 650 and the wheel status detection unit 430 may be configured as an integral device. As another example, some other components/modules (e.g., a storage unit) may be added into the lock control system.

Figure 7:
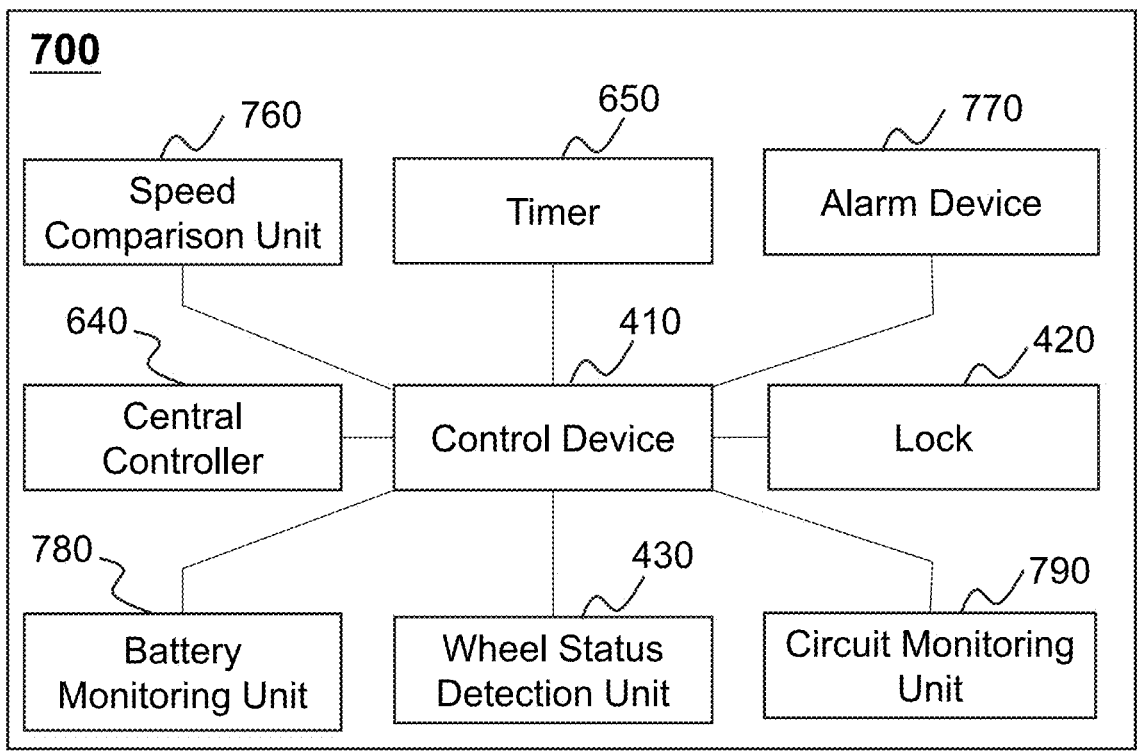
FIG. 7 is a block diagram illustrating an exemplary lock control system for a vehicle according to some embodiments of the present disclosure.

FIG. 7 is a block diagram illustrating an exemplary lock control system for a vehicle (e.g., the vehicle 140) according to some embodiments of the present disclosure. As illustrated in FIG. 7, the lock control system 700 may include the control device 410, the lock 420, the wheel status detection unit 430, the central controller 640, the timer 650, a speed comparison unit 760, an alarm device 770, a battery monitoring unit 780, and/or a circuit monitoring unit 790. More descriptions about the control device 410, the lock 420, the wheel status detection unit 430, and/or the timer 650 may be found elsewhere in the present disclosure (e.g., FIGS. 4-6 and descriptions thereof).

The speed comparison unit 760 may be operably coupled to the control device 410. The speed comparison unit 760 may be configured to adjust a frequency set by the timer 650 for detecting speed information of the vehicle based on a speed change (or a speed change trend) of the vehicle.

In some embodiments, when it is determined that the control device 410 does not execute a locking instruction, the timer 650 may send a signal to obtain speed information of the vehicle at an initial frequency to the wheel status detection unit 430. Alternatively, the timer 650 may be used for timing according to the initial frequency, and the speed information of the vehicle may be detected according to the timing of the timer 650. The initial frequency may be set according to a current speed of the vehicle or a default setting of the lock control system 700 or preset by a user or operator via the terminal devices 130. The wheel status detection unit 430 may obtain and transmit a speed of the vehicle to the speed comparison unit 760 at the initial frequency. The speed comparison unit 760 may compare a current speed with a previous speed of the vehicle and transmit a comparison result to the control device 410. For example, if the wheel status detection unit 430 obtains the speed of the vehicle at each 5 seconds (i.e., the initial frequency is 0.2 Hz), and a current time point is the 20th second, the speed comparison unit 760 may compare a speed obtained at the 20th second (i.e., the current speed) with a speed obtained at the 15th second (i.e., the previous speed). The control device 410 may send a signal to the timer 650 to adjust the frequency for detecting speed information of the vehicle based on the comparison result. The timer 650 may send a signal to obtain speed information of the vehicle at an updated (or adjusted) frequency to the wheel status detection unit 430.

The speed comparison unit 760 may determine whether the vehicle is in an acceleration status, a deceleration status, or a normal driving status during the vehicle moving process, based on the comparison result of the speed comparison unit 760. The frequency set by the timer 650 may be adjusted based on which working status the vehicle is in during the vehicle moving process, and thus the amount of data acquired by the wheel status detection unit 430 may be adjusted, thereby decreasing data computational burdens.

As used herein, an acceleration status may refer to a status in which the speed of the vehicle is increasing. A deceleration status may refer to a status in which the speed of the vehicle is decreasing. A normal driving status may refer to a status in which a fluctuation of the speed of the vehicle is substantially within a predetermined level. For example, if a fluctuation of the speed of the vehicle remains within 0.5 km/h, the vehicle may be in the normal driving status. The predetermined level of the speed fluctuation may be set according to a default setting of the lock control system 700 or preset by a user or operator via the terminal devices 130.

In some embodiments, when the vehicle is in the acceleration status (which means the vehicle may be getting started, and it may take a relatively long time to stop the vehicle and make the vehicle in a static status), the frequency may be decreased (i.e., the frequency may be adjusted to a relatively low level). When the vehicle is in the normal driving status (which means the vehicle may decelerate to stop at any time), the frequency may be increased (i.e., the frequency may be adjusted to a middle level). When the vehicle is in the deceleration status (which means the vehicle may stop at any time), the frequency may be increased (i.e., the frequency may be adjusted to a relatively high level). By increasing the frequency, after the vehicle stops moving, the wheel status detection unit 430 may immediately send the static status of the vehicle to the control device 410. Accordingly, the control device 410 may execute the locking instruction timely to lock the vehicle.

The central controller 640 may communicate with the control device 410 via a network (e.g., the network 120). The central controller 640 may be configured to send a locking instruction and/or an unlocking instruction to the control device 410. In some embodiments, the central controller may be disposed on a frame of the vehicle, or any other component of the vehicle.

In some embodiments, the central controller 640 may process information and/or data relating to the vehicle. For example, in response to a service request for locking the vehicle (e.g., initiated by a user), the central controller 640 may generate a locking instruction. As another example, the speed comparison unit 760 may transmit the comparison result to the central controller 640. The central controller 640 may send a signal to the timer 650 to adjust the frequency for detecting speed information of the vehicle based on the comparison result.

In some embodiments, an operator may operate to control the central controller 640 to perform multiple operations, such as sending a locking instruction and/or an unlocking instruction to the control device 410, reminding the operator to maintain the vehicle, etc.

In some embodiments, the operator may control the central controller 640 via a terminal device 130 operably coupled to (or in communication with) the central controller 640. In some embodiments, in response to a service request from the terminal device 130, the central controller 640 may generate the locking/unlocking instruction. The central controller 640 may transmit the locking/unlocking instruction to the control device 410. The control device 410 may generate and transmit a control signal to the lock 420 based on the locking/unlocking instruction. A drive device of the lock 420 may drive, based on the control signal, the movement of a locking mechanism (e.g., a lock pin) of the lock 420 to lock/unlock the vehicle.

In some embodiments, after or when the control device 410 executes the locking instruction, the control device 410 may send information indicating that the locking instruction is executed to the central controller 640. When the control device 410 does not (or determines not to) execute the locking instruction, the control device 410 may feed back information (indicating that the locking instruction is not executed) and/or status information (of the wheel) to the central controller 640. The operator may obtain information of the vehicle through the central controller 640 timely. In some embodiments, the central controller 640 may be configured as a control platform (e.g., the server 110 illustrated in FIG. 1) to control a plurality of control devices disposed on a plurality of vehicles.

In some embodiments, the processing device 112, the processor 220, or the CPU 340 may be part of the central controller 640. For example, if the vehicle is a bicycle of a bicycle sharing system, the central controller 640 may obtain a request for locking the lock 420 from the terminal device 130, and generate the locking instruction. In some embodiments, the processor 220 may be part of the control device 410. The control device 410 may send the locking instruction to the processor 220, and the processor 220 may determine whether to execute the locking instruction timely. It should be noted that the central controller 640 may be local or remote. For example, the central controller 640 may communicate with the control device 410 via the network 120. As another example, the central controller 640 may be disposed on the vehicle and physically connected to the control device 410 via a cable.

In some embodiments, if the central controller 640 sends an unlocking instruction to unlock the vehicle, the unlocking instruction may be directly sent to the lock 420 and/or directly executed by the lock 420 without using the control device 410.

For example, the central controller 640 may send the unlocking instruction to the lock 420 to cause the lock 420 to directly execute the unlocking instruction without using the control device 410.

In practical applications, when or before the lock 420 executes the unlocking instruction, the vehicle is in the static status, which may not cause unsafety of the rider/driver of the vehicle. Therefore, when or after the central controller 640 sends the unlocking instruction to unlock the vehicle, the lock 420 may directly execute the unlocking instruction to unlock the lock 420. In some embodiments, the unlocking instruction may be directly sent to the lock 420, and thus the control device 410 may not be used to obtain information and/or the status of the wheel and/or the vehicle. Alternatively, the central controller 640 may send the unlocking instruction to the control device 410, and the control device 410 may execute the unlocking instruction.

In some embodiments, upon receiving the unlocking instruction from the central controller 640, the control device 410 may not respond to the unlocking instruction (e.g., the control device 410 may not obtain the status of the vehicle), and may directly transmit the unlocking instruction to the lock 420. In some embodiments, upon receiving the unlocking instruction from the central controller 640, the control device 410 may respond to the unlocking instruction, and may execute the unlocking instruction based on the status of the vehicle. For example, the control device 410 may send a control signal to a drive device of the lock 420 based on the unlocking instruction. The drive device may cause, based on the control signal, the movement of a locking mechanism (e.g., a lock pin) to deviate from a certain position (e.g., a latching portion) of the lock 420 to unlock the vehicle.

In some embodiments, as illustrated in FIG. 7, the alarm device 770 and the battery monitoring unit 780 may be operably coupled to the control device 410. In some embodiments, the alarm device 770 and the battery monitoring unit 780 may be operably coupled to the central controller 640. The alarm device 770 may be configured to generate one or more alarms (e.g., a first alarm, a second alarm). For example, when the battery monitoring unit 780 detects that a battery power of the lock 420 is less than a threshold (e.g., 1%, 2%, 3%, 5%, 7%, 10%, 15%, etc.), the alarm device 770 may generate a first alarm. The threshold may be set according to a default setting of the lock control system 700 or preset by a user or operator via the terminal devices 130.

In some embodiments, if the battery power of the lock 420 is less than the threshold, the lock 420 of the vehicle may be unable to perform (according to the unlocking instruction or the locking instruction) unlocking and/or locking operations. In some embodiments, in order to avoid this issue, the battery monitoring unit 780 may monitor (e.g., simultaneously) the battery power of multiple components (e.g., the central controller 640, the control device 410, the lock 420, etc.) of the lock control system 700.

In some embodiments, the multiple components of the lock control system 700 may be operably coupled to a same battery and/or a same battery monitoring unit. In some alternative embodiments, each of the multiple components (e.g., the central controller 640, the control device 410, the lock 420, etc.) of the lock control system 700 may be operably coupled to a respective battery and/or a respective battery monitoring unit.

In some embodiments, the battery monitoring units corresponding to the multiple components may be independent of each other, so that the central controller 640 (or an operator of the central controller 640) can directly and/or timely identify which battery has a fault (e.g., the battery power of which battery is less than the threshold, or which battery is damaged), and timely maintenance or replacement of the battery that has a fault can be guaranteed.

In some embodiments, the alarm generated by the alarm device 770 may include a voice alarm, a light alarm, a voice-light alarm, etc. In some embodiments, the alarm may also include a message, a call, etc. According to the alarm(s), the operator of the central controller 640 can discover or be aware of the faults of the vehicle in time, and take timely actions (e.g., maintenance of the vehicle, replacement of one or more components of the vehicle) to recover the functions of the vehicle.

Exemplary voice alarms may include a voice of a speaker, a beep voice, etc. Exemplary light alarms may include a light with a prescribed color (e.g., red, green, yellow, etc.), a flashing light, etc. In some embodiments, the alarm device 770 may include a speaker configured to play the voice alarm(s). In some embodiments, the alarm device 770 may include a lamp configured to issue the light alarm(s).

In some embodiments, if the central controller 640 serves as a control platform, the alarm device 770 may generate alarms (e.g., voice broadcasts) for two or more vehicles. Merely by way of example, the alarm device 770 may broadcast information including, for example, vehicle numbers, locations of batteries having faults, or locations of the vehicles, or the like, or a combination thereof. Therefore, the operators can be aware of the vehicle(s) having fault(s), and the vehicle(s) can be maintained in time.

In some embodiments, as illustrated in FIG. 7, the circuit monitoring unit 790 may be operably coupled to the control device 410. In some embodiments, the circuit monitoring unit 790 may be operably coupled to the central controller 640. In some embodiments, if any of the circuits of the lock control system 700 has a fault, the circuit monitoring unit 790 may detect the fault, and the alarm device 770 may generate a second alarm.

In some embodiments, the second alarm may be different from or the same as the first alarm. For example, the first alarm may be a voice alarm, while the second alarm may be a light alarm. As another example, both the first alarm and the second alarm may be voice alarms. As still an example, the first alarm may be a red light alarm, while the second alarm may be a yellow light alarm. The first alarm and the second alarm are merely provided for the purposes of illustration, and not intended to limit the scope of the present disclosure.

The circuit monitoring unit 790 may be configured to monitor any of the circuits in the lock control system 700 including, for example, a circuit operably coupled to a sensor of the lock 420 (e.g., a sensor configured to detect whether the lock 420 is locked or unlocked), a circuit relating to the execution of the locking instruction (e.g., a circuit configured to facilitate the communication between the control device 410 and the lock 420), etc. If any circuit of the lock 420 has a fault, the circuit monitoring unit 790 may detect the fault, and the central controller 640 (or the alarm device 770) may timely generate a second alarm. Therefore, the operator of the central controller 640 may be aware of the fault, and may maintain the lock 420 of the vehicle in time.

It should be noted that the above descriptions of the lock control system are merely provided for the purposes of illustration, and not intended to limit the present disclosure. For persons having ordinary skills in the art, components of the lock control system may be combined in various ways or connected with other components as sub-systems under the teaching of the present disclosure and without departing from the principle of the present disclosure. For example, in some embodiments, the battery monitoring unit 780 and the circuit monitoring unit 790 may be integrated into a single device. As another example, the speed comparison unit 760 may be integrated into the wheel status detection unit 430. As a further example, some other components/modules/units may be added into the lock control system 700.

Figure 8:
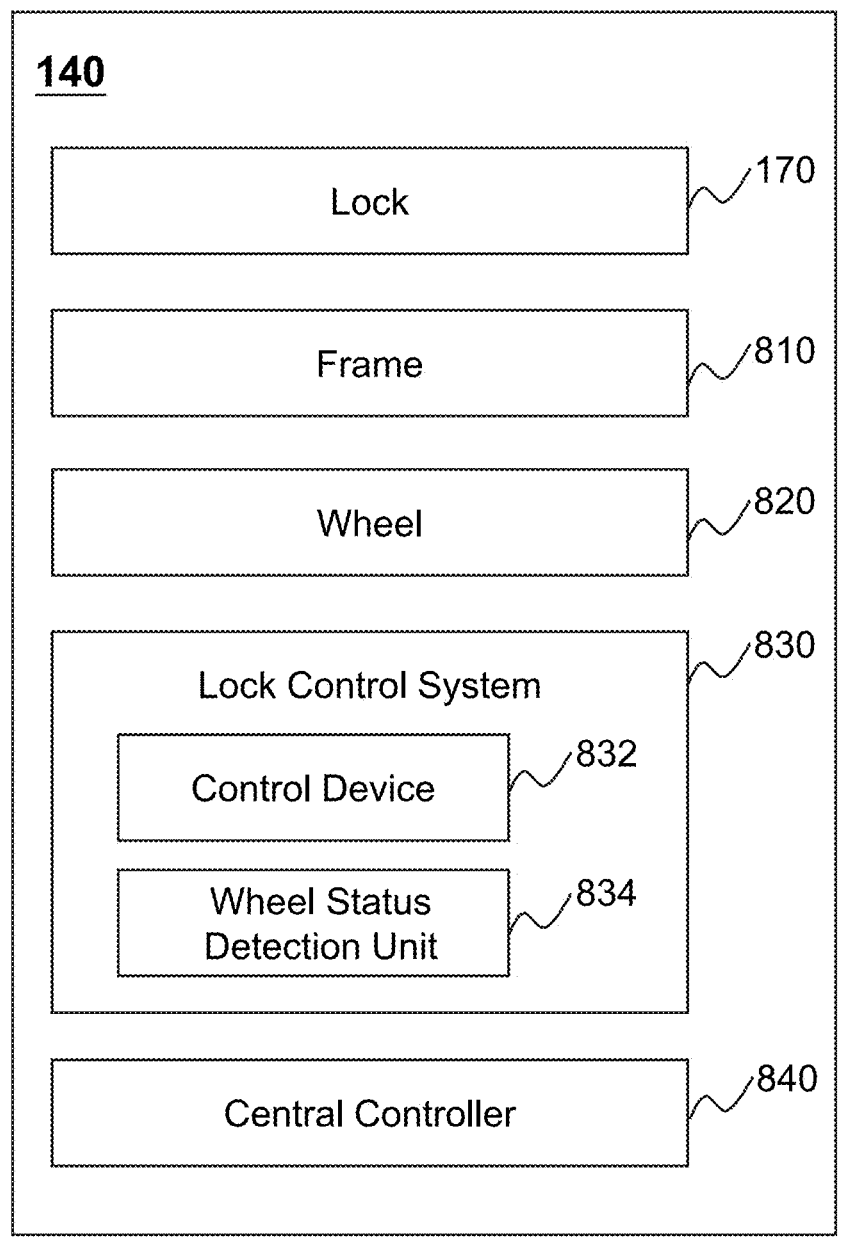
FIG. 8 is a block diagram illustrating exemplary components of a vehicle according to some embodiments of the present disclosure.

FIG. 8 is a block diagram illustrating exemplary components of a vehicle according to some embodiments of the present disclosure. The vehicle 140 may include a frame 810, one or more wheels 820, a lock 170, and a lock control system 830 (also referred to as a system for lock control). In some embodiments, the frame 810 may be configured to support the lock 170, the wheel(s) 820, and the lock control system 830.

In some embodiments, the wheel(s) 820 may be disposed on the frame 810. The wheel(s) may be capable of rotating when or after being disposed on the frame 810. In some embodiments, at least part of the lock 170 may be disposed on the frame 810. The wheel 820 and the at least part of the lock 170 being disposed on the frame 810 may facilitate the lock 170 to lock the wheel 820. The lock control system 830 may include a control device 832 and a wheel status detection unit 834. The control device 832 and the wheel status detection unit 834 may be disposed at any position of the frame 810.

The lock 170 may be configured to secure the vehicle 140. For example, the vehicle 140 may be a bicycle of a bicycle sharing system, and the lock 170 may be configured to lock one or more wheels of the bicycle. In some embodiments, the lock 170 may be configured to secure the bicycle to a fixed object such as a bicycle lock pillar or a rack. The lock 170 may include any combination of mechanisms to implement the function thereof described in the present disclosure. For example, the lock 170 may include a mechanical lock or an electronic lock. In some embodiments, the lock 170 may include a processing unit, a power supply, a locking mechanism, a lock status detection device, etc. In some embodiments, the lock 170 may be a horseshoe lock (as shown in FIG. 11) or a ring pin lock (as shown in FIGS. 12A-12B).

The lock control system 830 may be configured to control the lock 170 of the vehicle 140 (e.g., based on a status of the vehicle 140). The lock control system 830 may be the same as or similar to the lock control system illustrated in FIGS. 4-7. The control device 832 may be configured to control a status of the lock 170 (e.g., locking or unlocking status of the lock 170). The control device 832 may be the same as or similar to the control device illustrated in FIGS. 4-7.

Specifically, in some embodiments, the control device 832 may control the movement of a lock pin, such that the lock pin can insert into or withdraw from a lock shell of the lock 170, thereby realizing the unlocking and/or locking functions described in the present disclosure.

In some embodiments, upon receiving a locking instruction, the control device 832 may obtain a status of the wheel 820 (e.g., a motion status or a static status) from the wheel status detection unit 834. The control device 832 may determine whether to execute the locking instruction based on the status of the wheel 820. For example, if the wheel 820 is in the static status, the control device 832 may execute the locking instruction. As another example, if the wheel 820 is in the motion status, the control device 832 may not (immediately) execute the locking instruction. In some embodiments, the control device 832 may repeatedly obtain an updated status of the vehicle 140 until the updated status of the vehicle 140 is a static status.

The wheel status detection unit 834 may be configured to determine a status of the wheel 820. In some embodiments, when the wheel status detection unit 834 detects that the wheel 820 is in a motion status, the wheel status detection unit 834 may further acquire speed information of the wheel 820 repeatedly until the wheel 820 is in a static status. The wheel status detection unit 834 may timely transmit the speed information of the wheel 820 acquired repeatedly to the control device 832. In some embodiments, the wheel status detection unit 834 may obtain the speed information at a frequency associated with the speed of the vehicle 140. In some embodiments, the wheel status detection unit 834 may obtain speed information of the wheel 820, and determine the status of the wheel 820 based on the speed information. In some embodiments, the wheel status detection unit 834 may detect the status of the wheel continuously or periodically. The wheel status detection unit 834 may be the same as or similar to the wheel status detection unit illustrated in FIGS. 4-7.

In some embodiments, the vehicle 140 may include a central controller 840. The central controller 840 may be configured to send a locking instruction and/or an unlocking instruction to the control device 832. In some embodiments, after the central controller 840 sends out the locking instruction and the control device receives the locking instruction, the wheel status detection unit 834 may detect the status of the wheel 820 and transmit the status of the wheel 820 to the control device 832. In some embodiments, the central controller 840 may send an unlocking instruction to the lock 170 to cause the lock 170 to directly execute the unlocking instruction without using the control device 832. In some embodiments, the central controller 840 may be disposed on the frame 810. In some embodiments, the central controller 840 may serve as a control platform (e.g., the server 110 illustrated in FIG. 1) to control a plurality of control devices disposed on a plurality of vehicles.

It should be noted that the above descriptions of the lock control system 800 are merely provided for the purposes of illustration, and not intended to limit the present disclosure. For persons having ordinary skills in the art, components of the lock control system may be combined in various ways or connected with other components as sub-systems under the teaching of the present disclosure and without departing from the principle of the present disclosure. In some embodiments, some other components/modules may be added into the vehicle 140. For example, the vehicle 140 may also include a timer, an alarm device, a speed comparison unit, a battery monitoring unit, or a circuit monitoring unit, etc.

Figure 9:
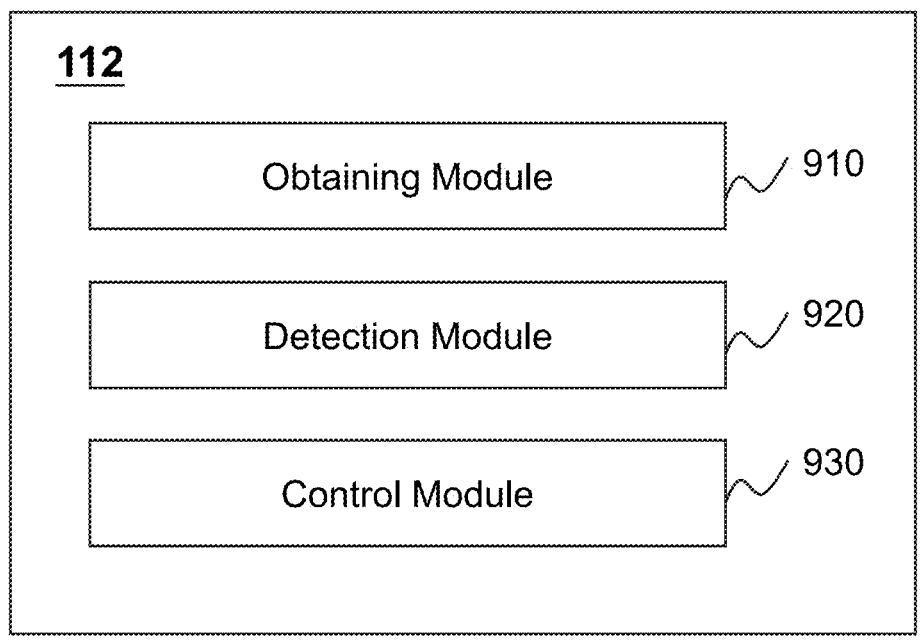
FIG. 9 is a block diagram illustrating an exemplary processing device according to some embodiments of the present disclosure.

FIG. 9 is a block diagram illustrating an exemplary processing device according to some embodiments of the present disclosure. In some embodiments, the processing device 112 may be implemented on a computing device 200 (e.g., the processor 220) illustrated in FIG. 2 or a mobile device (e.g., the CPU 340) as illustrated in FIG. 3. As illustrated in FIG. 9, the processing device 112 may include an obtaining module 910, a detection module 920, and a control module 930. Each of the modules described above may be a hardware circuit that is designed to perform certain actions, e.g., according to a set of instructions stored in one or more storage media, and/or any combination of the hardware circuit and the one or more storage media.

The obtaining module 910 may be configured to obtain a locking instruction for locking a subject. In some embodiments, the obtaining module 910 may further be configured to obtain an unlocking instruction for unlocking the subject. In some embodiments, the unlocking/locking instruction may be initiated by a user via the terminal device 130. In some embodiments, the locking instruction may be generated when a distance between the subject and the user is greater than a threshold. In some embodiments, the locking instruction may be automatically generated when a location of the subject is out of a service area. In some embodiments, in response to that the locking instruction is not executed, the obtaining module 910 may automatically generate another locking instruction again.

The detection module 920 may be configured to obtain a status of the subject. The status of the subject may include a motion status or a static status. In some embodiments, the detection module 920 may obtain the status of the subject from a wheel status detection unit (or a vehicle status detection unit) located on the lock or the subject. In some embodiments, upon receiving the locking instruction, the detection module 920 may send a signal to the wheel status detection unit to instruct the wheel status detection unit (or the vehicle status detection unit) to obtain status information associated with the wheel or the vehicle. In some embodiments, the detection module 920 may determine the status of the subject based on the speed (e.g., by comparing the speed with the speed threshold). The detection module 920 may further be configured to determine whether the subject is in the static status. If it is determined that the subject is in the motion status, the detection module 920 may obtain the status information of the wheel/subject in real time or periodically.

The control module 930 may be configured to lock the subject by controlling the lock of the subject based on the locking instruction and the static status of the subject. The control module 930 may send a control signal to a drive device of the lock based on the locking instruction and the static status of the subject. The drive device of the lock may control the movement of a locking mechanism (e.g., a lock pin) to lock the lock/subject.

It should be noted that the above descriptions are merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the obtaining module 910 and the control module 930 may be integrated into a single module. As another example, the processing device 112 may also include a transmission module configured to transmit signals (e.g., electrical signals, electromagnetic signals) to one or more components (e.g., the terminal device 130) of the security system 100. As a further example, the processing device 112 may include a storage module (not shown) used to store information and/or data (e.g., the unlocking/locking instruction, the status of the vehicle, the status of the lock, etc.) associated with the security system 100.

Figure 10:
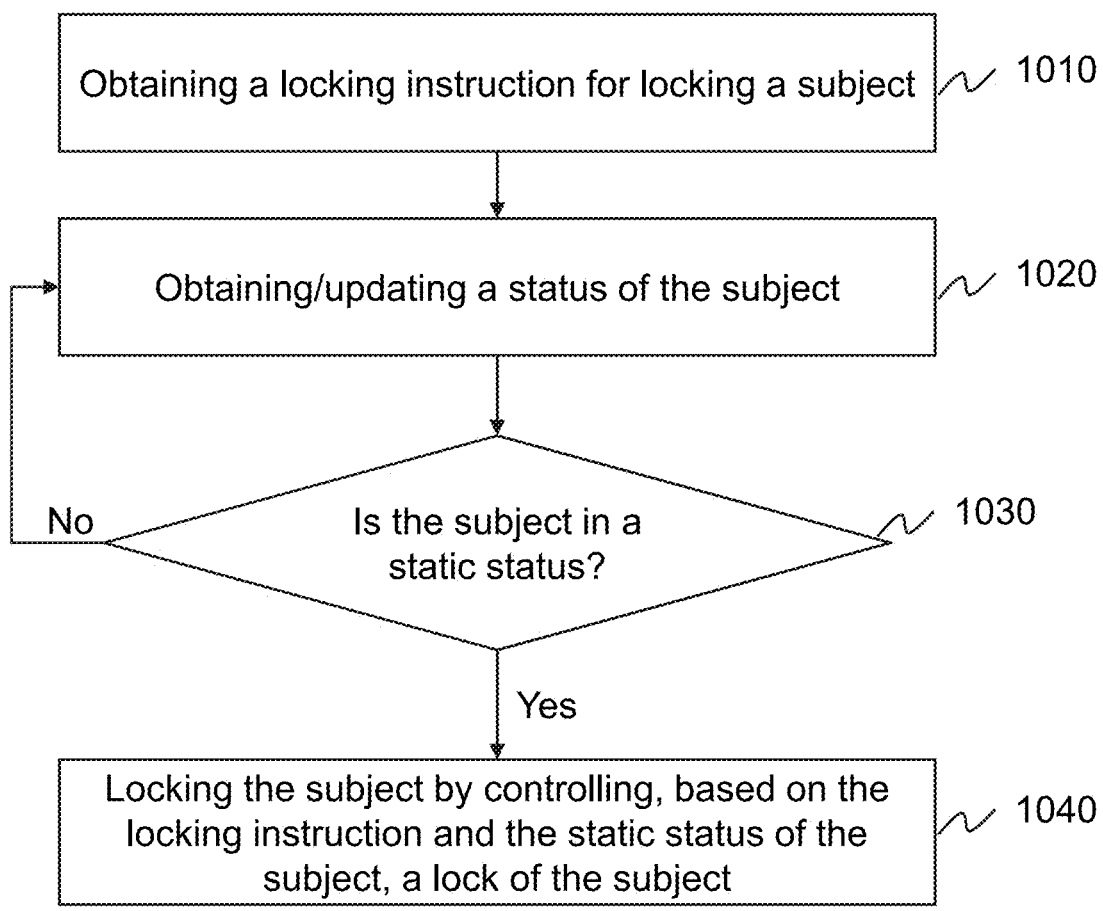
FIG. 10 is a flowchart illustrating an exemplary process for controlling a lock of a subject according to some embodiments of the present disclosure.

FIG. 10 is a flowchart illustrating an exemplary process for controlling a lock of a subject according to some embodiments of the present disclosure. In some embodiments, process 1000 may be implemented as a set of instructions (e.g., an application) stored in the storage device 150, ROM 230, or RAM 240, or storage 390. The processing device 112, the processor 220 and/or the CPU 340 may execute the set of instructions, and when executing the instructions, the processing device 112, the processor 220 and/or the CPU 340 may be configured to perform the process 1000. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 10 and described below is not intended to be limiting.

In some embodiments, as shown in FIG. 10, an exemplary process for locking a lock is provided. The process 1000 may include one or more of the following operations.

In 1010, the processing device 112 (e.g., the obtaining module 910) may obtain a locking instruction for locking a subject.

The subject may be a vehicle as described in connection with the vehicle 140 in FIG. 1. For example, the subject may include a bicycle, a power assisted bicycle (e.g., an electric bicycle), a tricycle, a motorcycle, a car, a motor vehicle, or the like, or any combination thereof. In some embodiments, the subject may be a bicycle in a bicycle sharing system. The bicycle may include a frame, a wheel, a lock, and a lock control system as described in FIG. 8.

The locking instruction may be configured to instruct a drive device of the lock to lock the subject. In some embodiments, the locking instruction may be initiated by a user (e.g., a user of a bicycle sharing system) via a user device (e.g., the terminal device 130). For example, in a bicycle sharing system, a user having left a rented bicycle without locking the bicycle may remotely send the locking instruction to the processing device 112 via an application installed in the user device. In some embodiments, the locking instruction may be generated based on the user's input operation, for example, pressing a button, pressing a digital button, inputting a password, scanning a barcode for locking the lock, etc. In some embodiments, the locking instruction may be generated when a distance between the subject and the user is greater than a threshold. For example, the processing device 112 may determine a distance between a location of the vehicle/lock and a location of the subject (i.e., a location of a user device of the user) based on GPS on the vehicle/lock and the user device. If the distance is greater than the threshold for a predetermined time, the processing device 112 may automatically generate the locking instruction. In some embodiments, the processing device 112 may determine a location of the subject based on a positioning system on the subject (e.g., the positioning device 160). In response to a determination that the location of the subject is out of a service area, the processing device 112 may automatically initiate the locking instruction. In some embodiments, if the locking instruction is not executed (e.g., in a time period), the processing device 112 may automatically generate another locking instruction again.

In 1020, the processing device 112 (e.g., the detection module 920) may obtain a status of the subject. The status of the subject may include a motion status or a static status. As used herein, the motion status of the subject may refer to that a speed of the subject is greater than a speed threshold, such as 0 m/s, 0.05 m/s, 0.1 m/s, 0.15 m/s, 0.2 m/s, etc. The static status of the subject may refer to that a speed of the subject is less than the speed threshold. The status of the subject may include or indicate information associated with the subject and/or the wheel, such as a speed of the wheel/subject, a rotation speed of the wheel, a location of the subject, or the like, or any combination thereof.

In some embodiments, the processing device 112 may obtain the status of the subject from a wheel status detection unit (or a vehicle status detection unit) located on the lock or the subject. In some embodiments, upon receiving the locking instruction, the processing device 112 may send a signal to the wheel status detection unit to instruct the wheel status detection unit (or the vehicle status detection unit) to obtain status information associated with the wheel or the vehicle. The processing device 112 may determine the status of the subject based on the status information of the wheel or the subject. For example, the processing device 112 may determine a speed of the subject based on the status information of the wheel or the subject. In some embodiments, the processing device 112 may determine the status of the subject based on the speed (e.g., by comparing the speed with the speed threshold).

The wheel status detection unit (or the vehicle status detection unit) may include a sensor. In some embodiments, the sensor may include a speed sensor, an acceleration sensor, an angular velocity sensor (also referred to as a gyroscope), a displacement sensor, a distance sensor, or the like, or any combination thereof. Exemplary speed sensors may include a photoelectric speed sensor, a magneto-electric speed sensor, a Hall-type speed sensor, etc. Exemplary speed sensors may include a longitude acceleration sensor, a lateral acceleration sensor, etc. Exemplary angular velocity sensors may include a roll rate sensor, a yaw rate sensor, etc. Exemplary displacement sensors may include a photoelectric displacement sensor, a Hall-type displacement sensor, etc. Exemplary distance sensors may include an electromagnetic sensor, an acoustic sensor, etc.

In some embodiments, the processing device 112 may determine the status of the subject based on a location of the subject within a time interval. The location may be obtained by a positioning device (e.g., the positioning device 160) on the subject. The processing device 112 may determine a motion status of the subject based on a difference (also referred to as a distance) between locations of the subject within a time interval. In some embodiments, the processing device 112 may convert the difference between the locations within the time interval into a motion speed. If the speed is greater than the speed threshold, the processing device 112 may determine the status of the subject as the motion status. In some alternative embodiments, the processing device 112 may directly determine the status of the subject based on the distance. For example, if the distance of locations within the time interval is greater than a distance threshold, the processing device 112 may determine the status of the subject as the motion status.

In some embodiments, the processing device 112 may obtain the status information of the wheel/subject in real time or periodically. In some embodiments, the processing device 112 may obtain the status information of the wheel/subject according to a requirement of a user. For example, upon receiving a locking instruction initiated by the user, the processing device 112 may obtain the status information of the wheel/subject from the vehicle status detection unit (or the vehicle status detection unit). In some embodiments, the processing device 112 may obtain the status information of the wheel/subject at a frequency associated with the speed of the subject. For example, the wheel status detection unit (or the vehicle status detection unit) may obtain the status information in real time, and transmit the status information to the processing device 112 at a specific frequency. As another example, the wheel status detection unit (or the vehicle status detection unit) may obtain the status information at a specific frequency, and may transmit the obtained status information to the processing device 112 timely.

In some embodiments, the frequency may be adjustable according to a speed change trend of the subject. For example, the processing device 112 may decrease the frequency in response to a determination that the speed of the subject is increasing. As another example, the processing device 112 may increase the frequency in response to a determination that the speed of the subject is decreasing.

In 1030, the processing device 112 (e.g., the detection module 920) may determine whether the subject is in a static status. If the status of the subject is the static status, the processing device 112 may proceed to operation 1040. That is, if it is determined that the subject is in the static status, the processing device 112 may execute the locking instruction. If the status of the subject is not the static status (i.e., the status of the subject is the motion status), and the locking instruction is effective (e.g., the locking instruction is not cancelled), the processing device 112 may return back to 1020 to obtain (or update) the status of the subject. That is, if it is determined that the subject is not in the static status, the processing device 112 may not execute the locking instruction. In some embodiments, if the locking instruction is not effective (e.g., over a period of time), the processing device 112 may automatically generate another locking instruction again.

In the present disclosure, the processing device 112 may first obtain the status of the subject after receiving the locking instruction. The processing device 112 may determine whether to execute the locking instruction based on the status of the subject (e.g., a rotation status of the wheel). Only when the status of the subject is the static status, the processing device 112 may execute the locking instruction. That is to say, after receiving the locking instruction, the processing device 112 may not immediately execute the locking instruction, but instruct the wheel status detection unit to detect the status information of the vehicle until a locking condition (i.e., the subject is in the static status) is satisfied. When the locking condition is satisfied, the processing device 112 may execute the locking instruction. Therefore, traffic accidents caused by a sudden stop of a moving subject may be avoided.

In 1040, the pressing device 112 (e.g., the control module 930) may lock the subject by controlling the lock of the subject based on the locking instruction and the static status of the subject.

In some embodiments, the processing device 112 may send a control signal to a drive device of the lock based on the locking instruction and the static status of the subject. The drive device of the lock may control the movement of a locking mechanism (e.g., a lock pin) to lock the lock/subject. For example, the drive device may cause the locking mechanism to move toward a target component (e.g., a latching portion) of the lock. In some embodiments, the locking mechanism and the target component may be disposed on opposite sides of the wheel. For example, the locking mechanism may be a first lock pin 1102 of a horseshoe lock 1100 shown in FIG. 11, while the target component may be a first latching position 1103 of the horseshoe lock 1100. The first lock pin 1102 and the first latching position 1103 may be disposed on opposite sides of the wheel, respectively. In some embodiments, the locking mechanism and the target component of the lock may be disposed on a same side of the wheel. For example, the locking mechanism may be a second lock pin 1209 of a ring pin lock 1206 shown in FIG. 12B, and the target component may be a second latching position 1210 of the ring pin lock 1206. The second lock pin 1209 and the second latching position 1210 may be disposed on a same side of the wheel. As another example, the lock may be a horseshoe lock, the drive device may cause the locking mechanism to protrude from a lock shell of the horseshoe lock, and the drive device may cause the target component (disposed on a same side of the wheel as the locking mechanism) to be coupled to the locking mechanism, so that the target component can limit the movement of the locking mechanism and prevent the locating mechanism from returning back to the lock shell to unlock the lock.

It should be noted that the above descriptions are merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, operation 1010 and operation 1020 may be combined into a single operation. As another example, one or more other optional operations (e.g., a storing operation) may be added elsewhere in the process 1000. In the storing operation, the processing device 112 (e.g., the storage module 940) may store information and/or data (e.g., the locking instruction, the status information of the wheel, the status of the vehicle, etc.) associated with the security system 100 in a storage device (e.g., the storage device 150) disclosed elsewhere in the present disclosure.

FIG. 11 is a schematic diagram illustrating an exemplary structure of a horseshoe lock according to some embodiments of the present disclosure. As shown in FIG. 11, the horseshoe lock 1100 may include a first lock shell 1101, a first lock pin 1102, and a first latching portion 1103. The first lock shell 1101 may be disposed on a frame (e.g., the frame 1204 illustrated in FIG. 12A) of a vehicle. The first lock pin 1102 may be disposed on the first lock shell 1101. The first latching portion 1103 may be a part of the first lock shell 1101 or may be located in the first lock shell 1101. The first lock pin 1102 and the first latching portion 1103 may be disposed on opposite sides of a wheel (e.g., the wheel 1205 illustrated in FIG. 12A), respectively. The first lock pin 1102 may coordinate with the first latching portion 1103 to block a spoke of the wheel, thereby realizing the locking of the vehicle.

The first lock pin 1102 may be configured to insert into the first latching portion 1103 to lock the vehicle. When the first lock pin 1102 is coupled to the first latching portion 1103, the first latching portion 1103 may limit a movement of the first lock pin 1102.

In some embodiments, by using a drive device (not shown in FIG. 11) in the first lock shell 1101, the first lock pin 1102 may be caused to protrude from the first lock shell 1101 and may pass through the wheel. The first lock pin 1102 may be coupled to the first latching portion 1103 disposed on the opposite side of the wheel, thereby blocking a spoke of the wheel to achieve the locking of the vehicle.

In some embodiments, the first latching portion 1103 may be a portion of the first lock shell 1101. That is, two ends of the first lock shell 1101 may be disposed on opposite sides of the wheel, respectively. In some embodiments, the first lock shell 1101 may be equipped with a first lock hole. In some embodiments, the first lock hole may function as the first latching portion 1103. When the first lock pin 1102 inserts into the first lock hole, the vehicle may be locked.

FIG. 12A is a schematic diagram illustrating an exemplary ring pin lock coupled to a vehicle according to some embodiments of the present disclosure. FIG. 12B is a schematic diagram illustrating an exemplary structure of a ring pin lock according to some embodiments of the present disclosure.

As shown in FIG. 12A, the ring pin lock 1206 may be configured to lock a vehicle having a wheel 1205. The wheel 1205 may be disposed on a frame 1204 of the vehicle. The vehicle may include a lock control system (not shown in FIG. 12A or 12B) configured to control the ring pin lock 1206. The lock control system may include a control device and a wheel status detection unit as described elsewhere in the present disclosure. More descriptions of the lock control system may be found elsewhere in the present disclosure (e.g., FIGS. 4-8 and descriptions thereof).

As shown in FIGS. 12A and 12B, the ring pin lock 1206 may include a second lock shell 1208, a second lock pin 1209, and a second latching portion 1210. The second lock shell 1208 may be disposed on the frame 1204. The second lock pin 1209 may be disposed in the second lock shell 1208. The second lock pin 1209 may be capable of protruding from the second lock shell 1208. The second latching portion 1210 may be annular. In some embodiments, the second latching portion 1210 may be disposed on the wheel 1205. In some embodiments, the second latching portion 1210 may be equipped with one or more second lock holes 1211 corresponding to the second lock pin 1209.

In some embodiments, the second lock shell 1208 may be fixed to the frame 1204. The second latching portion 1210 may be annular and may be fixed to the wheel 1205. For example, the second latching portion 1210 may be sheathed on a shaft of the wheel 1205. In some embodiments, the second latching portion 1210 may rotate with the wheel 1205. When driven by a drive device (not shown), the second lock pin 1209 may protrude from the second lock shell 1208, and insert into one of the one or more second lock holes 1211 set on the second latching portion 1210, thereby preventing the second latching portion 1210 from rotating, and preventing the wheel 1205 from rotating. Accordingly, the vehicle may be locked when the wheel 1205 is prevented from rotating.

In some embodiments, the vehicle may include a drum brake 1207. The drum brake 1207 may be coaxially disposed on the wheel 1205. The second latching portion 1210 may be disposed on an outer surface of the drum brake 1207.

Merely by way of example, the drum brake 1207 may be sheathed on the shaft of the wheel 1205, and the second latching portion 1210 may be sheathed on the drum brake 1207. In some alternative embodiments, the drum brake 1207 may serve as the second latching portion 1210.

That is, the outer surface of the drum brake 1207 may be equipped with one or more second lock holes 1211. When driven by the drive device, the second lock pin 1209 may insert into one of the one or more second lock holes 1211 of the drum brake 1207, thereby preventing the wheel 1205 from rotating.

In some embodiments, the outer surface of the drum brake 1207 may be equipped with one or more third lock holes each of which corresponding to one of the one or more second lock holes 1211. When driven by the drive device, the second lock pin 1209 may traverse one of the one or more third lock holes of the drum brake 1207, and insert into a second lock hole 1211, thereby preventing the wheel 1205 from rotating.

In some embodiments, the control device of the lock control system and the lock (e.g., the horseshoe lock 1100, the ring pin lock 1206) may not be integrated into one device, but may be set separately. For example, the control device and the lock may be disposed on different positions of the frame of the vehicle. Specifically, the lock may be disposed on a position of the frame near or close to the wheel of the vehicle, while the control device may be disposed on any location of the frame, such as a handle of the vehicle. In the present disclosure, the control device may be disposed on any location of the vehicle to control the status of the lock. The control device may control the status of the lock by controlling the drive device to drive a movement of the lock pin (e.g., the first lock pin 1102, the second lock pin 1209).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for lock control, comprising:
a control device configured to control a status of a lock;
a wheel status detection unit configured to determine a status of a wheel, wherein the wheel status detection unit includes or is operably coupled to a speed sensor, and the speed sensor is operably coupled to a timer configured to set a frequency for detecting speed information of the wheel; and
a central controller configured to send a locking instruction to the control device, wherein the control device is further configured to:
upon receiving the locking instruction, obtain the status of the wheel from the wheel status detection unit, and determine, based on the status of the wheel, whether to execute the locking instruction.

2. The system of claim 1, wherein the wheel status detection unit is further configured to:
acquire, when the wheel status detection unit detects that the wheel is in a motion status, speed information of the wheel repeatedly until the wheel is in a static status; and
transmit the speed information of the wheel acquired repeatedly to the control device.

3. The system of claim 2, wherein the control device is further configured to:
upon the wheel being in the static status, execute the locking instruction.

4. The system of claim 1, further comprising:
a speed comparison unit operably coupled to the control device and configured to adjust, based on a speed change trend of the wheel, the frequency for detecting speed information of the wheel.

5. The system of claim 1, wherein the central controller is further configured to send an unlocking instruction to the lock to cause the lock to directly execute the unlocking instruction without using the control device.

6. The system of claim 1, wherein the wheel status detection unit is further configured to detect the status of the wheel and transmit the status of the wheel to the control device after the central controller sends out the locking instruction and the control device receives the locking instruction.

7. The system of claim 1, further comprising:
an alarm device and a battery monitoring unit operably coupled to the central controller, the alarm device being configured to generate a first alarm when the battery monitoring unit detects that a battery power of the lock is less than a threshold.

8. The system of claim 1, further comprising:
a circuit monitoring unit operably coupled to the central controller and configured to detect a condition of a circuit of the system or the lock.

9. The system of claim 8, wherein the alarm device is further configured to generate a second alarm when the circuit monitoring unit detects an abnormal condition of the circuit of the system or the lock.

10. A method for lock control implemented on a system, the system comprising:
a control device configured to control a status of a lock;
a wheel status detection unit configured to determine a status of a wheel, wherein the wheel status detection unit includes or is operably coupled to a speed sensor, and the speed sensor is operably coupled to a timer configured to set a frequency for detecting speed information of the wheel; and
a central controller configured to send a locking instruction to the control device,
wherein the method comprises:
upon receiving the locking instruction, obtaining, by the control device, the status of the wheel from the wheel status detection unit, and
determining, by the control device, whether to execute the locking instruction based on the status of the wheel.

11. The method of claim 10, further comprising:
acquiring, by the wheel status detection unit, speed information of the wheel repeatedly until the wheel is in a static status when the wheel status detection unit detects that the wheel is in a motion status; and
transmit, by the wheel status detection unit, the speed information of the wheel acquired repeatedly to the control device.

12. The method of claim 11, further comprising:
upon the wheel being in the static status, executing, by the control device, the locking instruction.

13. The method of claim 10, wherein the system further comprises a speed comparison unit operably coupled to the control device and configured to adjust, based on a speed change trend of the wheel, the frequency for detecting speed information of the wheel.

14. The method of claim 10, further comprising:
sending, by the central controller, an unlocking instruction to the lock to cause the lock to directly execute the unlocking instruction without using the control device.

15. The method of claim 10, wherein the wheel status detection unit is further configured to
detect the status of the wheel and transmit the status of the wheel to the control device after the central controller sends out the locking instruction and the control device receives the locking instruction.

16. The method of claim 10, further comprising:
generating, by an alarm device, a first alarm when a battery monitoring unit detects that a battery power of the lock is less than a threshold, the alarm device and the battery monitoring unit being operably coupled to the central controller.

17. The method of claim 10, further comprising:
detecting, by a circuit monitoring unit operably coupled to the central controller, a condition of a circuit of the system or the lock.

18. The method of claim 17, further comprising:
generating, by an alarm device, a second alarm when the circuit monitoring unit detects an abnormal condition of the circuit of the system or the lock.

19. The system of claim 1, wherein the lock and the wheel are disposed on a vehicle.

20. The system of claim 1, wherein the central controller is disposed on a frame of the vehicle.

* * * * *